United States Patent
Hiemer et al.

(10) Patent No.: US 12,173,732 B2
(45) Date of Patent: Dec. 24, 2024

(54) SYSTEM AND METHOD FOR CONTROLLING A HYDRAULIC SUPPLY SYSTEM ON A MOBILE MACHINE

(71) Applicant: AGCO International GmbH, Neuhausen (CH)

(72) Inventors: Martin Hiemer, Marktoberdorf (DE); Simon Walz, Marktoberdorf (DE); Thomas Harrer, Marktoberdorf (DE); Felix Janot, Marktoberdorf (DE); Thomas Magg, Marktoberdorf (DE); Gabriel Reitemann, Marktoberdorf (DE)

(73) Assignee: AGCO International GmbH, Marktoberdorf (DE)

( * ) Notice: Subject to any disclaimer, the term of this patent is extended or adjusted under 35 U.S.C. 154(b) by 0 days.

(21) Appl. No.: 18/709,616

(22) PCT Filed: Nov. 15, 2022

(86) PCT No.: PCT/IB2022/060974
§ 371 (c)(1),
(2) Date: May 13, 2024

(87) PCT Pub. No.: WO2023/100006
PCT Pub. Date: Jun. 8, 2023

(65) Prior Publication Data
US 2024/0328435 A1   Oct. 3, 2024

(30) Foreign Application Priority Data
Dec. 3, 2021   (GB) ...................................... 2117535

(51) Int. Cl.
*F15B 11/16* (2006.01)
*B60K 25/02* (2006.01)
(Continued)

(52) U.S. Cl.
CPC ............ *F15B 11/165* (2013.01); *B60K 25/02* (2013.01); *F15B 21/00* (2013.01); *A01B 63/10* (2013.01);
(Continued)

(58) Field of Classification Search
CPC ........ F15B 11/165; F15B 21/02; F15B 21/08; A01B 63/10
See application file for complete search history.

(56) References Cited

U.S. PATENT DOCUMENTS

| 5,129,230 A | 7/1992 | Izumi et al. |
| 5,193,342 A | 3/1993 | Omberg et al. |

(Continued)

FOREIGN PATENT DOCUMENTS

| DE | 102009020111 A1 | 11/2010 |
| DE | 102014103932 B3 | 7/2015 |

(Continued)

OTHER PUBLICATIONS

UK Intellectual Property Office, Search Report for related UK Application No. GB2117535.1, dated May 31, 2022, 3 pages.
(Continued)

*Primary Examiner* — Thomas E Lazo

(57) ABSTRACT

A control system for hydraulic supply system which includes electronic load sensing is configured to adjust the pump supply pressure PSP in dependence on a determined rate of increase of a load sensing pressure LSP. Below a threshold value T of the rate of increase of the load sensing pressure LSP, the pump supply pressure PSP is adjusted so that it is higher than the load sensing pressure LSP by a stand-by pressure differential $\Delta P_{st}$. At or above the threshold value T, the pressure differential is increased to include a dynamic pressure differential $\Delta P_{dyn}$ in addition to the stand- (Continued)

by pressure differential $\Delta P_{st}$. A method of controlling a hydraulic system is also disclosed.

23 Claims, 10 Drawing Sheets

(51) Int. Cl.
    *F15B 21/00*     (2006.01)
    *A01B 63/10*     (2006.01)

(52) U.S. Cl.
    CPC ..... *B60K 2025/026* (2013.01); *F15B 2211/57* (2013.01)

(56) References Cited

U.S. PATENT DOCUMENTS

| | | | |
|---|---|---|---|
| 5,479,778 | A | 1/1996 | Toyooka et al. |
| 6,308,516 | B1 * | 10/2001 | Kamada ............... F15B 11/167 60/452 |
| 6,651,428 | B2 | 11/2003 | Takahashi et al. |
| 8,596,052 | B2 | 12/2013 | Vigholm et al. |
| 9,200,431 | B2 | 12/2015 | Mori et al. |
| 9,861,024 | B2 | 1/2018 | Vogler et al. |
| 10,329,739 | B2 | 6/2019 | Hoshino et al. |
| 10,550,868 | B2 * | 2/2020 | Vigholm ............... E02F 9/2296 |
| 10,575,454 | B2 | 3/2020 | De Nale et al. |
| 11,149,757 | B2 * | 10/2021 | Yumoto ............... E02F 9/2296 |
| 11,186,968 | B2 * | 11/2021 | Ono ............... E02F 9/2242 |
| 11,214,940 | B2 | 1/2022 | Takahashi et al. |
| 2007/0151238 | A1 | 7/2007 | Kraft |
| 2009/0031719 | A1 | 2/2009 | Tsuruga et al. |
| 2010/0154400 | A1 | 6/2010 | Krajnik et al. |
| 2010/0154401 | A1 | 6/2010 | Sullivan, Jr. et al. |
| 2014/0165543 | A1 | 6/2014 | Takebayashi et al. |
| 2017/0325393 | A1 | 11/2017 | Gschwendtner et al. |
| 2019/0345694 | A1 | 11/2019 | Schmuttermair et al. |
| 2021/0025133 | A1 | 1/2021 | Myers et al. |
| 2021/0025138 | A1 | 1/2021 | Muehlbauer et al. |
| 2022/0030756 | A1 | 2/2022 | Vennemann |

FOREIGN PATENT DOCUMENTS

| | | |
|---|---|---|
| DE | 102016107187 A1 | 10/2017 |
| EP | 0796952 A1 | 9/1997 |
| EP | 1266563 A1 | 12/2002 |
| EP | 2878829 A1 | 6/2015 |
| EP | 2886926 A1 | 6/2015 |
| JP | H0874805 A | 3/1996 |
| JP | 2001074001 A | 3/2001 |
| JP | 2008151211 A | 7/2008 |
| JP | 2008180203 A | 8/2008 |
| JP | 2009074406 A | 4/2009 |
| JP | 2009299301 A | 12/2009 |

OTHER PUBLICATIONS

European Patent Office, International Search Report related to International Patent Application No. PCT/IB2022/060974, mail date Feb. 17, 2023, 13 pages.

Dipl.-Ing. Rudiger Freimann, Springe: ""Kapitel 1-4" "Automation mobiler Arbeitsmaschinen—Gerat steuert Traktor"", Dec. 1, 2003 (Dec. 1, 2003), VDI-Verlag, Dusseldorf, XP055628781, pp. 1-150. Including translation of pp. 15, 68-70, 92. Including translation of pictures: 33, 35, 39. Including translation of tables: 11, 12.

\* cited by examiner

SYSTEM AND METHOD FOR CONTROLLING A HYDRAULIC SUPPLY SYSTEM ON A MOBILE MACHINE

CROSS-REFERENCE TO RELATED APPLICATIONS

This application is a national phase entry under 35 U.S.C. § 371 of International Patent Application PCT/IB2022/060974, filed Nov. 15, 2022, designating the United States of America and published in English as International Patent Publication WO 2023/100006 A1 on Jun. 8, 2023, which claims the benefit of the filing date of U. K. Patent Application 2117535.1 "System and Method for Controlling a Hydraulic Supply System on a Mobile Machine," filed Dec. 3, 2021, the entire disclosure of which is incorporated herein by reference.

FIELD

The disclosure relates to a control system for controlling a pressurized fluid supply system on a mobile machine. The control system is particularly applicable for use with a pressurized fluid supply system on a mobile agricultural machine, such as a tractor, which is capable of supplying pressurized fluid to consumers on the machine and to consumers on an agricultural implement attached to the machine. The disclosure also relates to a mobile machine, or to a combination of a mobile machine and attached implement, having such a control system, and to a method of controlling a pressurized fluid supply system on a mobile machine or on a mobile machine and attached implement combination.

BACKGROUND

Pressurized fluid (hydraulic) supply systems are widely used to drive consumers on agricultural or construction mobile machines, e.g. a tractor or a self-propelled harvester, or on implements attached thereto. Such mobile machines will be referred to hereinafter simply as machines and are sometimes referred to as vehicles. These hydraulic systems are mostly provided with a pump supply, consumers, control means (respectively control valves) and a tank to provide a fluid reservoir. The term "consumer" is used in the further description to encompass hydraulic drives such as rotary motors or linear rams but also for the respective control valves assigned to these drives. The term "control" in relation to supply systems hereby includes any adjustment of the supply system regarding direction, supply time or pressure of the fluid flow or the delivery of the pump used to supply the system. The term "pump supply" includes the pump and all valve means which are needed to adjust the fluid flow and/or fluid pressure supplied by the pump to a pump supply line. The pressure of the fluid provided by the pump supply being referred to herein as the pump supply pressure PSP.

In a hydrostatic hydraulic system, a pressure differential is needed to provide hydrostatic work (an output). This pressure differential between the pump supply (source) and consumer results in a fluid flow which is sufficient to undertake work, such as to lift a tractor three-point hitch or a operate a rotary drive on an implement or in a hydrostatic drive for example. Furthermore, a stand-by or static pressure differential $\Delta P_{st}$ is also needed when the system is otherwise in idle mode to keep control valves (assigned to consumers) responsive so that the spool of the valve can be moved on demand.

Hydraulic losses are present whenever oil circulates within a hydraulic system even when no consumer is operated. To mitigate this problem, it is known to provide means to forward a demand of a consumer to the pump supply. These systems are generally called load sensing systems (the term load sensing is abbreviated to LS). In such systems, a load induced pressure demand of the consumers, hereafter referred to as a "load sensing pressure" LSP, is hydraulically fed back to the pump supply via pipes or hoses so that pump supply oil flow/pressure can be adjusted according to the needs of the consumers. This load sensing pressure LSP feedback signal is typically generated by the control valve assigned to a consumer and the highest load sensing pressure LSP of all the consumers supplied by the pump is used to adjust the pump supply.

In general, there are two different types of hydraulic supply systems with LS demand feedback available on the market-closed-center load sensing systems (CC-LS systems) and open-center load sensing systems (OC-LS systems).

CC-LS systems are equipped with variable displacement pumps whereby the demand of the consumers is hydraulically fed back to the pump supply including an adjustment means for the pump so that the displacement of the pump is adjusted according to the needs of the consumers.

To ensure that a stand-by pressure differential $\Delta P_{st}$ is maintained in the supply to support fast system response, the pump is kept on low displacement to compensate for losses/leakage resulting in a stand-by pressure even if there is no demand by consumers. As a result of the reduction of the hydraulic fluid circulation, losses and power input required by the pump are reduced.

FIG. 1 illustrates part of a simplified known CC-LS hydraulic circuit. A pump supply 10 includes a variable displacement pump 12 which draws fluid from a tank 14 and forwards pressurized fluid to consumers (not shown) via a pump supply line P. Fluid is returned to the tank from the consumers via a return or tank line T. The pump 12 can be any suitable variable displacement pump and could, for example, be a swash plate axial piston pump in which the displacement of the pump is changed by pivoting the swash plate by means of a pump actuator 16 to vary the piston stoke. In the arrangement illustrated, actuator 16 is biased by a spring to pivot the swash plate in a direction to increase pump displacement and hence the output of the pump. Pressurized fluid introduced into a chamber 20 of the actuator opposes the force of the spring and if the force of the fluid is greater than that of the spring the swash plate is pivoted to reduce the delivery of the pump.

Operation of the actuator 16 is controlled by a flow control valve 22 and a pressure limiting valve 24, which together with the actuator 16 form a pump controller and form part of the pump supply 10. Each of the valves is biased by a respective spring 26, 28 to the position shown in which the actuator chamber 20 is connected to the tank 14. Each of the valves has a pump pressure port 30, 32 connected to the pressure line P of pump so that the fluid pressure acting on the valve spool through the pump pressure port 30, 32 opposes the force of the respective spring 26, 28. The flow control valve 22 also has a LS pressure port 34 to which a load sensing pressure signal line LS is connected. The highest consumer load sensing pressure LSP of the various consumers in the hydraulic LS system is fed into the LS pressure signal line so that the load sensing pressure LSP is added to the force of the spring to move the valve spool towards the position shown. The spring 26 in the flow control valve sets the stand-by pressure differential $\Delta P_{st}$ which is typically in the region of 10 to 30 bar for tractor applications. The spring force may be adjustable to enable the stand-by pressure differential $\Delta P_{st}$ to be adjusted. The spring 28 of the pressure limiting valve sets the maximum operating pressure of the system, which could be in the region 250 bar in the present example. Again, the spring force may be adjustable to enable the maximum operating pressure to be adjusted.

In normal operation when the system is at idle with no demand from the consumers, the pump supply pressure PSP acting through the pump pressure port 30 of the flow control valve 22 moves the spool against the force of the spring 26 to introduce pressurized fluid in to the chamber 20 of the actuator. This causes the actuator to pivot the swash plate and reduce the output of the pump until the pump supply pressure PSP balances the force of the spring 26 so that the output of the pump is held at the stand-by pressure $\Delta P_{st}$.

When a load sensing pressure signal LSP (or an increasing load sensing pressure signal) is reported to the LS pressure port 34 via the LS sensing line, this is added to the force of the spring 26 moving the valve spool so that the fluid pressure in the chamber 20 of the actuator is reduced. In response, the actuator 16 moves the swash plate to increase the output of the pump until the pump supply pressure PSP balances the force of the spring 26 and the load sensing pressure signal LSP. The pump therefore delivers a pump supply pressure PSP that is higher than the load sensing pressure LSP by the stand-by pressure differential $\Delta P_{st}$.

The pressure limiting valve 24 is usually held in the position shown by the spring 28 so that fluid passes into and out of the actuator chamber 20 under the control of the flow control valve 22. However, should the pump supply pressure PSP exceed the maximum permitted system pressure, as defined by the spring 28, the spool of the pressure limiting valve 24 is moved against the spring force to admit pressurized fluid into the chamber 20 of the actuator. This reduces the output of the pump until the pump supply pressure PSP it is brought back below the maximum permitted system pressure.

Generally, CC-LS systems are more expensive and complex than OC-LS systems but they have the advantage that the pump is only delivering above the stand-by pressure $\Delta P_{st}$ on demand. This has a positive effect on the overall system efficiency. These systems are mainly used in high performance and high specification tractors (e.g. >100 kW) used to supply complex and powerful implements.

In contrast to CC-LS systems, OC-LS systems are provided with a fixed displacement pump. FIG. 2 illustrates part of a simplified OC-LS hydraulic circuit. A constant displacement pump 12' draws hydraulic fluid from a tank 14 and delivers it to various consumers (not shown) via a pump supply or pressure line P. Fluid is returned to the tank 14 from the consumers via a return or tank line T. A proportional pressure compensator valve 40 forms part of the pump supply and is operative to selectively connect the pump supply line P to the tank 14. The spool of the valve 40 is biased by a spring 44 towards a closed position, as shown, in which pump supply line P is not connected to the tank. This spring sets a static or stand-by pressure differential $\Delta P_{st}$ and the spring force may be adjustable to enable the stand-by pressure differential $\Delta P_{st}$ to be adjusted. The pump supply pressure PSP is applied to the opposite end of the spool via a pressure port 46 to oppose the force of the spring. The valve also has an LS pressure port 48 through which a consumer load sensing pressure signal LSP is applied to the valve spool to act in addition to the spring force.

In an idle mode in which there is no consumer demand, the pump supply pressure PSP opposes the spring force to open the valve and connect the pump supply line P to the tank. The pump supply pressure PSP in the pump supply line falls until it balances the spring force and is then held at the stand-by pressure differential $\Delta P_{st}$. If a consumer load sensing pressure signal LSP is forwarded to the valve 40 via the LS pressure port 48, this adds to the spring force tending to close the valve so that the pump supply pressure PSP increases until it balances the combination of the spring force and the load sensing pressure LSP. The pump supply pressure PSP is thereby held a level which is higher than the load sensing pressure LSP by the stand-by pressure differential $\Delta P_{st}$ defined by the spring 44.

A further trend can be seen related to the supply and control means used on implements attached to an agricultural machine, such as a tractor. Due to increasing automation in agricultural work, implements are provided with more and more control functions which require complex control strategies. While in the past implements were equipped with only a few controllable drives (e.g. hydraulic cylinders or motors) which were controlled by valves on the tractor, today implements are provided with numerous controllable drives which cannot be controlled by the valves installed on the tractor. To address this, tractors are often equipped with power beyond systems (which may also be referred to in the art as high-pressure carry over). As the name suggests, these systems supply an uncontrolled (at the tractor) fluid flow from the pump supply to the implement via a respective interface, such as quick couplers. The implement itself is then equipped with control means in form of valves to adjust the parameters of the fluid supply. Similar to internal consumers on the tractor, these power beyond systems also include a LS function so that the load sensing pressure of consumers on the implement can be fed back to the pump supply on the tractor via a hydraulic LS line.

A typical power beyond interface 50 is illustrated in FIG. 1 and includes quick release hydraulic couplings 50a, 50b, 50c for releasably connecting a pump supply line P, a return or tank line T, and an LS signal line on the tractor to equivalent hydraulic lines Pi, Ti, LSi on the implement. As illustrated, the LS line ($LS_{pb}$) from the power beyond interface which reports a LS signal from the consumers on the implement and an LS line ($LS_t$) which reports a LS signal from the consumers on the tractor are connected to the LS pressure port 34 on the flow control valve 22 though a shuttle valve 52 or another functionally similar arrangement. This ensures that the highest LS load sensing pressure signal from the implement or the tractor is used to control the output of the pump. If there are a number of consumers on the implement, shuttle valves are used to ensure the highest LS load sensing pressure signal LSP of the implement consumers is fed through to the power beyond LS connection 50c. Similarly, if there are a number of consumers on the tractor, shuttle valves or other functionally similar arrangements are used to feed the highest LS load sensing pressure signal LSP of the tractor consumers to the $LS_t$ line and hence to the shuttle valve 52.

A major advantage of the power beyond system is that the costs involved with fluid supply control are moved from the tractor to the implement so that a wider range of applications can be handled by tractors with reduced hydraulic control capability. These power beyond systems have mainly been the reserve of tractors with higher performance (>100 kW)

and CC-LS systems. However, a demand has been recognized for smaller tractors with OC-LS systems to provide power beyond, for example vineyard tractors with about 70 kW have to provide a supply to complex implements such as fruit harvesters equipped with many hydraulic drives to be controlled.

A drawback with purely hydraulic LS arrangements is that the hydraulic load sensing pressure signal LSP has to be forwarded to the pump supply by hydraulic lines. If the load sensing pressure signal LSP comes from a consumer on an implement, a coupling is required to releasably connect the implement hydraulic LS signal line with a hydraulic LS signal line on the tractor. Furthermore, the various hydraulic LS signal lines from different consumers must be connected via shuttle valves to ensure that the highest consumer load sensing pressure LSP is forwarded to the pump supply. This all involves considerable additional expense and takes up valuable installation space. To overcome these drawbacks, electrohydraulic load sensing (E-LS) arrangements have been developed.

U.S. Patent Application Publication 2007/0151238 A1, "Hydrostatic Drive System," published Jul. 5, 2007, discloses a hydrostatic drive system in which a variable displacement pump controller is actuated electronically by an electronic control device. A pressure sensor is used to detect a hydraulic consumer load sensing pressure LSP and provides an input to the electronic control system. The electronic control system generates an electronic control signal for actuating the displacement pump controller via a LS control valve to set the pump supply pressure PSP so that it is higher than the sensed load sensing pressure LSP by a set amount $\Delta P_{st}$. The system avoids the need for lengthy hydraulic LS load sensing pressure signal lines.

German Patent 102014103932 B3, "Control Device for a Hydraulic Working Machine, Hydraulic System and Method for Controlling a Hydraulic System," granted Jul. 23, 2015, discloses an E-LS system for an implement towed by a tractor. The towed implement has an electronic control device which determines the difference between the pump supply pressure PSP and the highest load sensing pressure LSP of the consumers on the towed implement. An electronic signal indicative of the pressure difference is forwarded to a hydraulic control module coupled to a LS connection of a variable displacement pump on the tractor. The hydraulic control module converts the electronic signal to a hydraulic control signal for controlling the pump displacement.

U.S. Patent Application Publication 2019/0345694 A1, "Hydraulic Control Arrangement for an Arrangement of Mobile Machines, and Arrangement of Mobile Machines," published Nov. 14, 2019, discloses a further E-LS system for a tractor and towed implement which does not necessarily require an electronic controller on the implement. In the arrangement disclosed, a pressure sensor is provided on the tractor to detect a hydraulic LS load sensing pressure signal LSP provided by the implement via a power beyond LS coupling. The pressure sensor forwards an electronic load sensing pressure signal ELSPS representative of the hydraulic load sensing pressure LSP to an electronic control unit on the tractor which controls a transducer (e.g. a solenoid actuated pressure limiting valve) to provide a hydraulic pump supply control signal HPSCS having a pressure $P_{set}$ for forwarding to a variable displacement pump controller. A further pressure sensor may be provided to forward an electronic load sensing pressure signal ELSPS representative of the highest load sensing pressure LSP of a number of consumers on the tractor. In this case, the electronic control unit selects the highest of the electronic load sensing pressure signals to use as a basis to control the transducer. The hydraulic pump supply control signal HPSCS output from the transducer may be connected with the pump controller via a shuttle valve, with a hydraulic load sensing pressure signal LSP from a steering system providing a further input to the shuttle valve. In this case, the highest pressure of the hydraulic pump supply control signal HPSCS from the transducer or the load sensing pressure LSP from the steering system is forwarded to the pump controller. This illustrates how E-LS and traditional hydraulic LS can be combined.

Arrangements for adjusting the pump supply pressure PSP in an E-LS system can be similar to those illustrated in either of FIGS. 1 and 2, except that a hydraulic pump supply control signal HPSCS for application to the LS pressure port 34, 48 of a flow control valve 22 or pressure compensator valve 40 is produced using a suitable transducer in dependence on an electronic pump supply control signal EPSCS from the controller. The transducer may be a solenoid-controlled pressure limiting valve, for example. The solenoid valve is actuated by the controller as a function of the hydraulic load sensing pressure demand LSP detected by a pressure sensor.

FIG. 3 illustrates how a pump supply 10 including a variable displacement pump 12 similar to that described above in relation to FIG. 1 can be adapted to incorporate a solenoid-controlled pressure limiting valve for use with an E-LS system. The pump supply 10 includes a flow control valve 22' to control the flow of fluid between the pump supply line P, the chamber 20 of the pump control actuator 16 and the tank 14. As in the hydraulic LS system of FIG. 1, a spring 26 sets the stand-by or static pressure differential and is opposed by the pressure in the pump supply line P connected to the pressure port 30 of the flow control valve 22'. However, for use in an E-LS system, the fluid pressure $P_{set}$ supplied to the LS pressure port 34 is set by a solenoid-controlled pressure limiting valve 54. When no current is provided to the solenoid 56 of the pressure limiting valve 54, the LS pressure port 34 is fully connected to the tank 14 and the pump supply pressure PSP at port 30 is opposed only by the force of the spring 26 in the flow control valve 22' so that the pump output is maintained at the stand-by pressure $\Delta P_{st}$. When a consumer load sensing pressure LSP is detected by a pressure sensor and forwarded to a controller, the controller generates an electronic pump supply control signal EPSCS which is forward to the solenoid of the pressure limiting valve 54. The electronic pump supply control signal EPSCS actuates the pressure limiting valve 54 so that a hydraulic pump supply control signal HPSCS at a pressure $P_{se}t$ is applied at the LS port 34 of the flow control valve 22' in addition to the spring force. This causes the pump displacement to be increased until the pump supply pressure PSP balances the combination of the spring force and the pressure $P_{se}t$ of the hydraulic supply control signal HPSCS.

As illustrated in U.S. Patent Application Publication 2019/0345694 A1, the hydraulic pump supply control signal HPSCS generated by the pressure limiting valve 54 may be forwarded to the LS port 34 via a shuttle valve with a conventionally generated hydraulic load sensing pressure signal LSP provided as second input to the shuttle valve. This arrangement enables an E-LS system to be integrated with a conventional, hydro-mechanical hydraulic LS system.

For use with a fixed displacement pump arrangement such as that illustrated in FIG. 2, a solenoid actuated pressure limiting valve 54 can be used to generate a hydraulic pump supply control signal HPSCS for application to the LS pressure port 48 of the pressure compensator valve 40.

Other electronically controlled transducer arrangements can be used to convert an electronic pump supply control signal EPSCS into a hydraulic pump supply control signal HPSCS.

Though the known E-LS systems and methods work well and alleviate some of the problems of a purely hydraulic LS system, they have their own drawbacks. One issue the applicant has found is that E-LS increases the overall reaction time to adjust the pump supply pressure PSP in response to an increase in consumer load sensing pressure LSP. This can be explained by the fact that in a hydraulic LS system, the load sensing pressure signal LSP is forward by a generally static fluid column in the LS lines which immediately forwards a load sensing pressure demand. In electrohydraulic E-LS systems, the pressure sensors must communicate with the controller and the controller must communicate with the solenoid pressure limiting valve or other actuator for adjusting the pump supply pressure. This communication typically takes place over CAN or ETHERNET-BUS Networks. As a consequence, the electronic LS signal transfer depends on cycle times and these depend on the performance levels of the components. With the numerous electronic control systems used in agricultural machines today, the overall response time may be considerably higher compared to purely hydraulic LS systems.

There is a need then for alternative methods of controlling a hydraulic supply system which overcome, or at least mitigate, some or all of the drawbacks of the known methods and a need to provide hydraulic supply systems configured to carry out such alternative methods.

There is also an ongoing desire to improve the way hydraulic systems are controlled to optimize functioning of the system depending on operational and/or economic requirements. For example, in some circumstances it may be desirable to promote faster reaction time in adjusting the pump in response to a change in consumer load pressure LSP over system efficiency, and in other circumstances system efficiency may be more important than reaction time. It is desirable, therefore, to provide methods of operating a hydraulic supply system using E-LS which provides for greater flexibility in determining how the system reacts in response to an increase in consumer load sensing pressure demand LSP and hydraulic systems configured to carry out such methods.

BRIEF SUMMARY

Aspects of the disclosure relate to a control system for controlling a hydraulic system of a mobile machine and/or of a mobile machine and attached implement combination, to mobile machine/mobile machine/attached implement combination, and to a method for controlling a hydraulic system of a mobile machine and/or of a mobile machine and attached implement combination.

In some embodiments, there is provided a control system for controlling a hydraulic system on a mobile machine, wherein the hydraulic system includes a pump supply for supplying a pressurized fluid to at least one consumer on the mobile machine and/or an implement attached to the mobile machine. The control system comprises one or more controllers, and is configured to receive, from a pressure sensor of a load sensing LS system associated with the at least one consumer, a pressure signal indicative of a sensed load sensing pressure LSP associated with the at least one consumer; determine, from the received pressure signal, a rate of change of the load sensing pressure LSP; and adjust a pump supply pressure provided by the pump supply in dependence on the determined rate of change of the LSP.

Advantageously, taking into account the rate of change of a load sensing pressure demand signal LSP when adjusting the pump supply pressure enables a faster, more dynamic, adjustment of the pump supply pressure in response to a rapidly rising load sensing pressure signal. However, if the load sensing pressure signal is not rising rapidly, a less dynamic but more efficient adjustment of the pump can be undertaken.

The one or more controllers may collectively comprise an input (e.g. an electronic input) for receiving one or more input signals (e.g. the pressure signal) indicative of a sensed load sensing pressure LSP. The one or more controllers may collectively comprise one or more processors (e.g. electronic processors) operable to execute computer readable instructions for controlling operation of the control system, for example to determine the rate of change of a load sensing pressure LSP signal from a pressure signal received from a pressure sensor. The one or more processors may be operable to generate one or more control signals for controlling the pump supply pressure PSP. The one or more controllers may collectively comprise an output (e.g. an electronic output) for outputting the one or more control signals such as a pump supply control signal.

In an embodiment, the control system is configured to adjust the pump supply pressure PSP such that it is higher than the load sensing pressure LSP by a first pressure differential when a determined rate of change of the load sensing pressure LSP is below a threshold value T and to adjust the pump supply pressure PSP such that it is higher than the load sensing pressure LSP by a second pressure differential larger than the first for at least a limited time period AP when a determined rate of change of the load sensing pressure LSP is at or above the threshold value T.

In an embodiment, the first pressure differential comprises a static or stand-by pressure differential $\Delta P_{st}$ and the second pressure differential comprises the static or stand-by pressure differential $\Delta P_{st}$ plus a dynamic pressure differential $\Delta P_{dyn}$.

In an embodiment, the control system is configured to adjust the pump supply pressure PSP such that it is higher than the load sensing pressure LSP by the second pressure differential for at least a limited time period AP when a determined rate of change of the load sensing pressure LSP is at or above the threshold value T but below a second threshold value T2 higher than the first mentioned threshold value T, and to adjust the pump supply pressure PSP such that it is higher than the load sensing pressure LSP by a third pressure differential larger than the second pressure differential for at least a limited time period AP when a determined rate of change of the load sensing pressure LSP is at or above the second threshold value T2. In an embodiment, the second pressure differential comprises the static or stand-by pressure differential $\Delta P_{st}$ plus a second dynamic pressure differential $\Delta P2_{dyn}$ larger than the first mentioned dynamic pressure differential $\Delta P_{dyn}$.

Advantageously, this enables a stepped or tiered response to a rapidly rising load sensing pressure gradient.

In an embodiment, the control system is configured to apply a dynamic pressure differential $\Delta P_{dyn}$, $\Delta P2_{dyn}$, for an application period AP. The application period AP may be in the range of 50 to 300 ms, or in the range of 80 to 200 ms, or in the range of 90 to 150 ms, or in the region of 100 ms to be effective. The system may be configured to apply different application periods AP depending on operational requirements, such as for different consumers.

In an embodiment, the control system is configured to apply a minimum delay period DP between applications of a dynamic pressure differential $\Delta P_{dyn}$, $\Delta P2_{dyn}$. The delay period DP may be in the range of 600 to 1400 ms, or in the range of 800 to 1200 ms, or in the region of 1000 ms.

The one or more controllers may be configured to generate an electronic pump supply control signal, the control system comprising a transducer for converting the electronic pump supply control signal to a hydraulic pump supply control signal $P_{set}$ for forwarding to a hydraulic pump supply adjustment system. The control system may include a shuttle valve configured to forward the highest of a hydraulic pump supply control signal $P_{set}$ and a hydraulic load sensing signal associated with a consumer to the hydraulic pump supply adjustment system.

The hydraulic system may include more than one consumer and more than one pressure sensor, each pressure sensor for sensing a load sensing pressure LSP associated with at least one of the consumers. In this case, the one or more controllers may be configured to receive pressure signals indicative of sensed load sensing pressure LSP from each of the pressure sensors and the control system configured to adjust the pump supply pressure in dependence on the pressure signal indicative of the highest load sensing pressure LSP received by the one or more controllers at any given time.

In an embodiment, the one or more controllers are configured to apply values for the threshold value T of the rate of change of load sensing pressure and/or the dynamic pressure differential $\Delta P_{dyn}$ in dependence on one or more of the following: the consumer generating the load sensing pressure signal LSP on which adjustment of the pump supply output is dependent; operational parameters of the hydraulic system; the value of the load sensing pressure LSP; and the dynamic behavioral characteristics of a branch of the hydraulic system which supplies the consumer generating the load sensing pressure signal LSP on which adjustment of the pump supply is dependent.

In an embodiment, the one or more controllers further configured to generate one or more control signals for implementing a sequence of commands for automatically controlling actuators of the mobile agricultural machine and/or an attached implement to execute a headland sequence of operations as part of a headland maneuver. The headland sequence includes actuation of at least one of the plurality of consumers giving rise to a consumer demand. The one or more controllers are configured when executing the headland sequence to apply pre-determined values for the threshold value T of the rate of change of load sensing pressure and/or the dynamic pressure differential $\Delta P_{dyn}$. The pre-determined values for the threshold value T of the rate of change of load sensing pressure and/or the dynamic pressure differential $\Delta P_{dyn}$ may such as to provide a dynamic response of the hydraulic supply to an increase in load sensing pressure LSP which is higher than the dynamic response immediately prior to the headland sequence being initiated.

In an embodiment, the one or more controllers are configured to apply a first threshold value T and first dynamic pressure differential $\Delta P_{dyn}$ when the load sensing pressure LSP is below a threshold pressure TP and to apply a different threshold value T and/or a different dynamic pressure differential $\Delta P_{dyn}$ when the load sensing pressure LSP is at or above the first threshold pressure TP. The one or more controllers may be configured so that a dynamic pressure differential $\Delta P_{dyn}$ is applied when the load sensing pressure LSP is at or above a second threshold pressure TP2 higher than the first mentioned threshold pressure TP regardless of the rate of change of the load sensing pressure.

In an embodiment, the one or more controllers are configured to: automatically adjust the threshold value T of the rate of change of load sensing pressure LSP and/or the dynamic pressure differential $\Delta P_{dyn}$; and determine an operational response of the at least one consumer with reference to an operational target associated with the at least one consumer.

The one or more controllers may also be configured to: store (in a memory accessible by the one or more controllers) value(s) for the threshold T for the rate of change of load sensing pressure LSP and/or the dynamic pressure differential $\Delta P_{dyn}$ in dependence on the determined operational response "meeting" the operational target; and retrieve/apply stored value(s) for the threshold T and/or the dynamic pressure differential $\Delta P_{dyn}$ during subsequent operation of the respective consumer(s).

The operational target may be to meet a desired time limit by which a certain pump supply pressure PSP is achieved in dependence on sensed load sensing pressure demand LSP.

The hydraulic system may comprise at least one consumer on an implement attached to the mobile machine which is supplied with pressurized fluid from the pump supply on the mobile machine. In this case, the one or more controllers may be configured to receive, from a pressure sensor of a load sensing LS system associated with the at least one consumer on the implement, a pressure signal indicative of a sensed load sensing pressure LSP associated with the at least one consumer on the implement.

In an embodiment, the one or more controllers comprise at least a first controller on the mobile machine and a second controller on the implement. The first and second controllers are in communication with one another. The second controller is configured to forward data to the first controller indicative of value(s) for the threshold T of the rate of change of load sensing pressure LSP and/or the dynamic pressure differential $\Delta P_{dyn}$ applicable when the pump supply pressure PSP is adjusted in dependence on a load sensing pressure associated with the at least one consumer on the implement.

In an embodiment, the control system is configured to determine when a consumer demand is expected and to increase the pump supply pressure in dependence on a determination that a consumer demand is expected and to subsequently adjust the pump supply pressure PSP in dependence on a consumer load sensing pressure LSP.

In an embodiment, the control system is configured to subsequently adjust the pump supply pressure PSP in dependence on a consumer load sensing pressure LSP if:
a) the rate of change of the detected load sensing pressure LSP is at or below a threshold value;
b) the rate of change of the detected load sensing pressure LSP shows a general decrease indicative that the hydraulic demand of the at least one of the consumers will be met within a given time limit;
c) the pump supply pressure PSP is determined to be at least within a pre-determined percentage of the required load sensing pressure LSP; or
d) if the detected load sensing pressure LSP as at or above a threshold value.

The pre-determined percentage of the required load sensing pressure in option c) may be at least 80%, or 90%, or 95%, or 100%.

In an embodiment, the control system is configured to subsequently adjust the pump supply pressure PSP in dependence on a consumer load sensing pressure LSP after a set time limit if a change to a load-sensing-based adjustment has not been triggered by the load sensing pressure prior to the end to the time limit.

The one or more controllers may be configured to monitor actuation of a user input and/or actuation of a control valve for the at least one consumer to determine when a load sensing pressure LSP or increase in load sensing pressure LSP from the consumer is expected.

In an embodiment, the pump supply includes a variable displacement pump having a pump controller including a flow control valve for regulating movement of an actuator to adjust the pump displacement. In this embodiment, the one or more controllers may be configured to generate an electronic pump supply control signal. The control system comprises a transducer for converting the electronic pump supply control signal to a hydraulic pump supply control signal $P_{set}$ for forwarding to an LS pressure port of the flow control valve. The transducer may be a solenoid-controlled pressure limiting valve.

In an alternative embodiment, the pump supply includes a fixed displacement pump, the pump supply comprising a pressure compensator valve for selectively connecting a pump supply line to a reservoir (tank) to vary the pump supply pressure PSP. In this embodiment, the one or more controllers may be configured to generate an electronic pump supply control signal, the control system comprising a transducer for converting the electronic pump supply control signal to a hydraulic pump supply control signal $P_{set}$ for forwarding to an LS pressure port of the pressure compensator valve. The transducer may be a solenoid-controlled pressure limiting valve.

In another embodiment, there is provided a control system for controlling a hydraulic system of a mobile machine and/or of a mobile machine and attached implement combination, wherein the control system includes an electronic load sensing system configured to adjust the output a pump supply in dependence on load sensing pressure LSP signals from at least some hydraulic consumers. The control system is configured to determine both the value and rate of change of load sensing pressure LSP and, in at least some operating modes, to increase a pump supply pressure PSP above the load sensing pressure LSP by an additional amount in the form of a dynamic pressure differential for at least a limited time period if a rate of increase of the load sensing pressure LSP reaches a threshold value Tr.

In some embodiments, a control system for controlling a mobile agricultural machine, wherein the mobile agricultural machine has a hydraulic system including a pump supply for supplying a pressurized fluid to a plurality of consumers on the mobile agricultural machine and/or an implement attached to the mobile agricultural machine. The control system comprises one or more controllers configured to: receive, from a pressure sensor of an electronic load sensing LS system associated with one or more of the plurality of consumers, a pressure signal indicative of a sensed load sensing pressure LSP associated with the one or more of the plurality of consumers; and determine from the pressure signal both the value and rate of change of a load sensing pressure LSP and to compute and generate a control signal for regulating a pump supply pressure provided by the pump supply in dependence on the value sensed load sensing pressure LSP. The one or more controllers are further configured when operating in at least one mode of control to generate a control signal for regulating a pump supply pressure which is configured to increase the pump supply pressure above the load sensing pressure LSP by an additional dynamic pressure differential $\Delta P_{dyn}$ for at least a limited time period if the determined rate of change of an increasing load sensing pressure LSP reaches a threshold value Tr.

The one or more controllers may be configured to generate the control signal for regulating a pump supply pressure PSP including a dynamic pressure differential $\Delta P_{dyn}$, for a time limited application period AP only. The application period AP may be in the range of 50 to 300 ms, or in the range of 80 to 200 ms, or in the range of 90 to 150 ms, or in the region of 100 ms to be effective. The one or more controllers may be configured to apply different application periods AP depending on operational requirements, such as for different consumers.

In an embodiment, the one or more controllers are configured apply a minimum delay period DP between applications of a dynamic pressure differential $\Delta P_{dyn}$. The delay period DP may be in the range of 600 to 1400 ms, or in the range of 800 to 1200 ms, or in the region of 1000 ms.

In some embodiments, there is provided a mobile machine comprising a hydraulic system including a pump supply for supplying a pressurized fluid to at least one consumer on the mobile machine and/or an implement attached to the mobile machine and a control system for controlling the hydraulic system as described above.

Some embodiments include a method of controlling a hydraulic system on a mobile machine, wherein the hydraulic system includes a pump supply for supplying a pressurized fluid to at least one consumer on the mobile machine and/or an implement attached to the mobile machine. The method comprises: receiving, from a pressure sensor of a load sensing LS system associated with the at least one consumer, a pressure signal indicative of a sensed load sensing pressure LSP associated with the at least one consumer; determining, from the received pressure signal, a rate of change of the load sensing pressure LSP; and adjusting a pump supply pressure provided by the pump supply in dependence on the determined rate of change of the LSP.

In an embodiment, the method comprises adjusting the pump supply pressure PSP so that it is higher than the load sensing pressure LSP by a first pressure differential when a determined rate of change of the load sensing pressure LSP is below a threshold value T and adjusting the pump supply pressure PSP such that it is higher than the load sensing pressure LSP by a second pressure differential larger than the first for at least a limited time period AP when a determined rate of change of the load sensing pressure LSP is at or above the threshold value T. The first pressure differential may comprise a stand-by pressure differential $\Delta P_{st}$. The second pressure differential may comprise the stand-by pressure differential $\Delta P_{st}$ plus a dynamic pressure differential $\Delta P_{dyn}$.

The method may comprise adjusting the pump supply pressure PSP such that it is higher than the load sensing pressure LSP by the second pressure differential for at least a limited time period AP when a determined rate of change of the load sensing pressure LSP is at or above the threshold value T but below a second threshold value T2 higher than the first mentioned threshold value T, and adjusting the pump supply pressure PSP such that it is higher than the load sensing pressure LSP by a third pressure differential larger than the second pressure differential for at least a limited time period AP when a determined rate of change of the load sensing pressure LSP is at or above the second threshold value. The third pressure differential may comprise the stand-by pressure differential $\Delta P_{st}$ plus a second dynamic pressure differential $\Delta P2_{dyn}$ larger than the first mentioned dynamic pressure differential $\Delta P_{dyn}$.

In an embodiment, the method comprises applying a dynamic pressure differential $\Delta P_{dyn}$, $\Delta P2_{dyn}$, for a time limited application period AP. The application period AP may be in the range of 50 to 300 ms, or in the range of 80 to 200 ms, or in the range of 90 to 150 ms, or in the region of 100 ms to be effective. The method may comprise applying different application periods AP depending on operational requirements, such as for different consumers.

In an embodiment, the method comprises waiting for a minimum delay period DP after a dynamic pressure differential $\Delta P_{dyn}$, $\Delta P2_{dyn}$ has been applied before a further dynamic pressure differential $\Delta P_{dyn}$, $\Delta P2_{dyn}$ is applied. The delay period DP may be in the range of 600 to 1400 ms, or in the range of 800 to 1200 ms, or in the region of 1000 ms.

The delay period DP may be larger than the application period AP.

In an embodiment in which the hydraulic system comprises more than one consumer and more than one pressure sensor for sensing load sensing pressures LSP of at least some of the consumers, each pressure sensor being in signal communication with the one or more controllers, the method may comprise adjusting the pump supply pressure PSP in dependence on the pressure signal indicative of the highest load sensing pressure LSP forwarded to the one or more controllers at any given time.

The method may comprise applying values for the threshold value T of the rate of change of load sensing pressure and/or the dynamic pressure differential $\Delta P_{dyn}$ in dependence on or more of the following: the consumer generating the load sensing pressure signal LSP on which adjustment of the pump supply is dependent; operational parameters of the hydraulic system; the value of the load sensing pressure LSP; and the dynamic behavioral characteristics of a branch of the hydraulic system which supplies the consumer generating the load sensing pressure signal LSP on which adjustment of the pump supply is dependent.

In an embodiment, a method comprises applying predetermined values for the threshold value T of the rate of change of load sensing pressure and/or the dynamic pressure differential $\Delta P_{dyn}$ during a headland sequence. The predetermined values for the threshold value T of the rate of change of load sensing pressure and/or the dynamic pressure differential $\Delta P_{dyn}$ may be selected to enable the pump supply to satisfy a predicted hydraulic load demand of at least one consumer actuated as part of the headland sequence.

In an embodiment, the method comprises apply a first threshold value T and first dynamic pressure differential $\Delta P_{dyn}$ when the load sensing pressure LSP is below a threshold pressure TP and applying a different threshold value T and/or a different dynamic pressure differential $\Delta P_{dyn}$ when load sensing pressure LSP is at or above the first threshold mentioned pressure TP. The method may comprise not applying a dynamic pressure differential $\Delta P_{dyn}$ when the load sensing pressure is at or above a second threshold pressure TP2 higher than the first mentioned threshold pressure TP regardless of the rate of change of the load sensing pressure.

In an embodiment, a method comprises: using one or more controllers configured to automatically adjust the threshold value T of the rate of change of the load sensing pressure LSP and/or the dynamic pressure differential $\Delta P_{dyn}$; and determining an operational response of the at least one consumer with reference to an operational target associated with the at least one consumer.

The operational target may be to meet a desired time limit by which a certain pump supply pressure PSP is achieved in dependence on sensed load sensing pressure demand LSP.

The method may also comprise storing (in a memory accessible to the one or more controllers) value(s) for the threshold T for the rate of change of load sensing pressure LSP and/or the dynamic pressure differential $\Delta P_{dyn}$ in dependence on the determined operational response meeting the operational target; and retrieving/applying stored value(s) for the threshold T and/or the dynamic pressure differential $\Delta P_{dyn}$ during subsequent operation of the respective consumer(s).

If the hydraulic system comprises an implement attached to the mobile machine, the implement having one or more hydraulic consumers supplied with pressurized fluid from the pump supply on the mobile machine, the method may comprise receiving, from a pressure sensor of a load sensing LS system associated with the at least one consumer on the implement, a pressure signal indicative of a sensed load sensing pressure LSP associated with the at least one consumer on the implement.

In some embodiments, there is provided computer software comprising computer readable instructions which, when executed by one or more processors, causes performance of the methods described above.

Another embodiment provides a computer readable storage medium comprising the computer software. Optionally, the storage medium comprises a non-transitory computer readable storage medium.

Within the scope of this disclosure it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Embodiments will now be described, by way of example only, with reference to the further accompanying drawings, in which.

DETAILED DESCRIPTION

Figure 4:
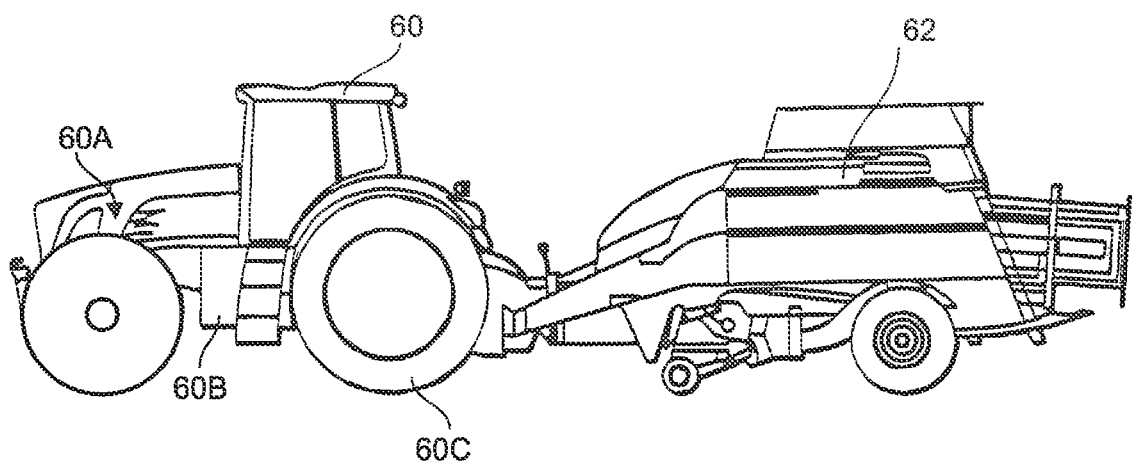
FIG. 4 is a schematic side view of an agricultural machine and implement combination.

FIG. 4 illustrates a combination comprising a mobile agricultural machine 60 and an implement 62 attached to the rear of the machine. The implement 62 can be any suitable agricultural implement attachable to an agricultural machine having hydraulic consumers supplied with pressurized hydraulic fluid from a hydraulic supply system on the machine 60. The implement 62 will be referred to as a rear implement 62 and a further implement having hydraulic consumers fed by the supply on the machine, not shown in FIG. 4 but see FIG. 5, may be attached to the front of the tractor and will be referred to as a front implement 63.

The agricultural machine in the embodiment shown in the drawings and described below is specifically an agricultural tractor 60 and the rear implement 62 is a baler. Other types of rear implement commonly used with tractors include, without limitation, a loading wagon, a towed sprayer, and a towed potato harvester. Furthermore, the disclosure is not limited to application on tractors or other mobile agricultural machines but can be adapted for use with other mobile machines having a hydraulic supply system whether connected with an implement or not.

In an embodiment, the tractor 60 has an engine 60A and a continuously variable transmission 60B for transmitting drive from the engine to at least the rear wheels 60C of the tractor. Rather than wheels, the tractor may have other types of ground engaging members such as endless tracks through which drive is transmitted from the engine to move the tractor across the ground. In other embodiments, the tractor need not have a continuously variable transmission.

Figure 5:
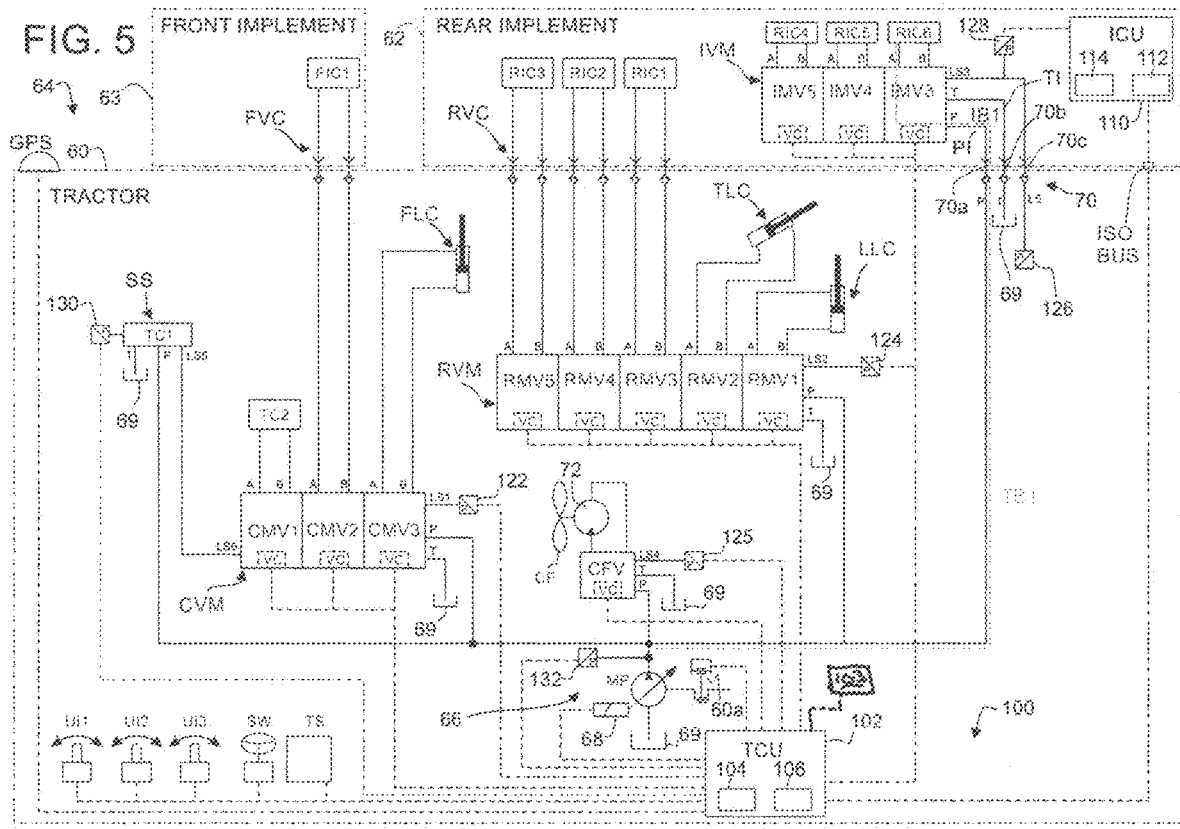
FIG. 5 is a schematic representation of an embodiment of a hydraulic system embodied in the combination of FIG. 4.

FIG. 5 is a simplified representation of a hydraulic supply system 64 suitable for use on the tractor 60 and implement 62, 63 combination. The hydraulic supply system 64 incorporates an E-LS system and is configured as disclosed herein.

Hydraulic Network

The hydraulic supply system 64 has pump supply 66 including main pump MP which is of variable displacement type and a pump output controller 68 for adjusting the displacement of the pump. In an embodiment, the pump output controller 68 is configured in a manner similar to that illustrated in FIG. 3. However, in other embodiments, alternative pump output controller arrangements can be adopted including any of those currently used with E-LS systems which enable an electronic controller to regulate and adjust the flow and/or pressure output of the pump supply 66.

The pump MP draws fluid from a tank 69 and supplies pressurized hydraulic fluid at a pump supply pressure PSP to consumers on the tractor and the implement via a pump supply line P. The tank 69 provides a reservoir for the hydraulic supply system in which the fluid is held generally at ambient pressure. The tank 69 is illustrated schematically in FIG. 5. In practice in any given hydraulic supply system 64 there may a single tank 69 or multiple tanks 69.

The consumers on the tractor 60 include a hydraulic steering system SS, a central valve manifold CVM, and a rear valve manifold RVM.

The steering system SS may include a hydraulic cylinder and control valve designated tractor consumer TC1 for moving the steered wheels. The control valve is connected to the pump supply line via a pressure port P and to the tank via a tank port T.

The central valve manifold CVM is installed generally in or toward the middle of the tractor and includes a number of functional valves for controlling a corresponding number of hydraulic consumers located usually in or toward the middle and front area of the tractor. In the example illustrated, the central valve manifold CVM includes three functional valves CMV1, CMV2, CMV3 assembled together and connected to the pump supply line via a common pressure port P and to a return line to the tank at a common return port T. Each valve is assigned to a specific consumer and the valves CMV1, CMV2, CMV3 may have different configurations (e.g., ON/OFF, proportional valves, 3/2 valves, 4/2 valves) according the functional needs of their respective consumer. The valves CMV1, CMV2, CMV3 are solenoid valves and each has a valve controller VC for controlling the solenoid. The number and configuration of the valves in the CVM may be varied to meet the requirements of the tractor manufacturer and/or the end customer. There may, for example, be more or fewer than three functional valves in the CVM.

The CVM has a common load sensing port LS1 and each of the valves CMV1, CMV2, CMV3 have LS ducts connected to the common LS port LS1 by means of shuttle valves so that the highest load sensing pressure LSP generated by the various valves CMV1, CMV2, CMV3 at any given point in time is forwarded to the LS port.

The CVM can be used to supply hydraulic fluid to various consumers such as, without limitation, a front linkage actuator FLC and an axle suspension system indicated as tractor consumer TC2. Valves in the CVM can also be used to supply consumers on a front implement 63 attached to the tractor indicated as FIC1. Each consumer on the front implement 63 being hydraulically connected to a respective valve CMV2 via front valve couplings FVC.

The RVM is installed in the rear of the tractor and is provided to supply consumers which are mainly in the rear area of the tractor and/or on a rear implement 62. The RVM is similar to the CVM in terms of design and variability and contains a number of functional valves indicated as RMV1 to RMV5 assembled together and connected to the pump supply line via a common pressure port P and to a return line to the tank at a common return port T. At least some of the valves in the RVM may be used to supply consumers on a rear implement 62 and/or on the tractor 60. In the exemplary embodiment illustrated, three of the valves, RMV3, RMV4, and RMV5, are connected with respective consumers RIC1, RIC2, RIC3 on the rear implement 62 via rear valve couplings RVC. The RVC may be directly flanged to the RVM as described in European Patent Application Publication 2886926 A1, "Hydraulic Coupling Seal," published Jun. 24, 2015. As it is common to attach complex implements to the rear of a tractor, there may be more than three valves in the RVM for connection to consumers on a rear implement 62. There may, for example, be as many as six, seven, eight or more valves in the RVM assigned for connection to consumers on rear implements. At least some of the valves in the RVM may be assigned to consumers located at or towards the rear of the tractor such as actuators on a rear linkage system. In the exemplary embodiment shown, valve RMV1 is assigned to a pair of lower link hydraulic cylinders LLC being supplied in parallel and valve RMV2 is assigned to a hydraulically driven top link actuator cylinder TLC. In an alternative embodiment, the top link actuator may be a mechanical actuator and the valve RMV2 used for other purposes.

Each valve RMV1 to RMV5 in the RVM is a solenoid actuated valve and is provided with a valve controller VC which moves the solenoid and provides a pilot pressure. Each valve is configured according to the requirements of its respective consumer (e.g., ON/OFF, proportional valves, 3/2 valves, 4/2 valves).

The RVM has a common load sensing port LS2 and LS ducts of the valves RMV1, RMV2, RMV3, RMV4, RMV5 are all connected to the common LS port LS2 by means of shuttle valves so that the highest load sensing pressure LSP generated by the various valves at any given point in time is forwarded to the common LS port LS2.

As with the CMV, the RVM can be configured to have any required number and configuration of valves depending on the number and requirements of the hydraulic consumers on the tractor and any implements that are expected to be attached to the tractor. It should be understood, therefore, that the configuration of the CVM and RVM shown in FIG. 5 is for illustrative purposes only and can be varied.

The hydraulic supply system 64 includes a power beyond interface 70 to provide an "uncontrolled" supply of pressurized fluid to a rear implement 62 which requires more hydraulic functions than can be controlled using the available valves on the tractor. Such a complex implement 62 may be a baler, for example. The power beyond interface 70 includes quick release couplings 70a, 70b to connect the pump supply line P and a return tank line T on the tractor to a pump pressure supply line PI and a return line TI respectively on the implement 62. The power beyond interface provides a pressurized fluid supply to an implement which is at the pump supply pressure PSP but which is otherwise uncontrolled on the tractor.

In a typical arrangement, the rear implement 62 has an implement valve manifold IVM similar to the CVM and RVM as described above. The IVM has a number of functional control valves IMV1 to IMV3 which are each connected to the implement pump supply pressure line PI through a common pressure port P and to the implement return line TI via a common return port T. The IVM also has a common LS pressure signal port LS3 to which LS ducts of each of the valves IMV1 to IMV3 are connected via a series of shuttle valves arranged so that the highest consumer load sensing pressure LSP from the various valves in the IVM at any given point in time is reported to the common LS port LS3. Each valve IMV1 to IMV3 is connected to a respective consumer (e.g. a hydraulic cylinder or hydraulic motor) which are schematically designated RIC4 to RIC6. Each valve is configured according to the requirements of its respective consumer (e.g., ON/OFF, proportional valves, 3/2 valves, 4/2 valves). The valves are all solenoid-controlled valves and each is provided with an electronic valve controller VC which moves the solenoid and provides a pilot pressure (supplied via pump connection to support the valve slider movement).

The number of valves in the IVM is selected depending on the number of consumers on the implement that are to be supplied via the power beyond interface and can be varied as required. Furthermore, there may be more than one valve manifold on the implement and/or one or more separate valves not incorporated into a manifold can be connected to the power beyond interface via suitable hydraulic lines.

In the embodiment shown, the tractor has a further hydraulic consumer in the form of a hydraulic motor 72 for driving a cooling fan CF. The hydraulic motor 72 is controlled by a cooling fan valve CFV which regulates the cooling fan motor to vary the speed of the fan. The CFV is a solenoid-controlled valve having an electronic valve controller VC which is operably connected with an electronic controller 102 on the tractor. The controller is configured to actuate the CFV in order to adapt the motor speed to the cooling demand.

Figure 3:
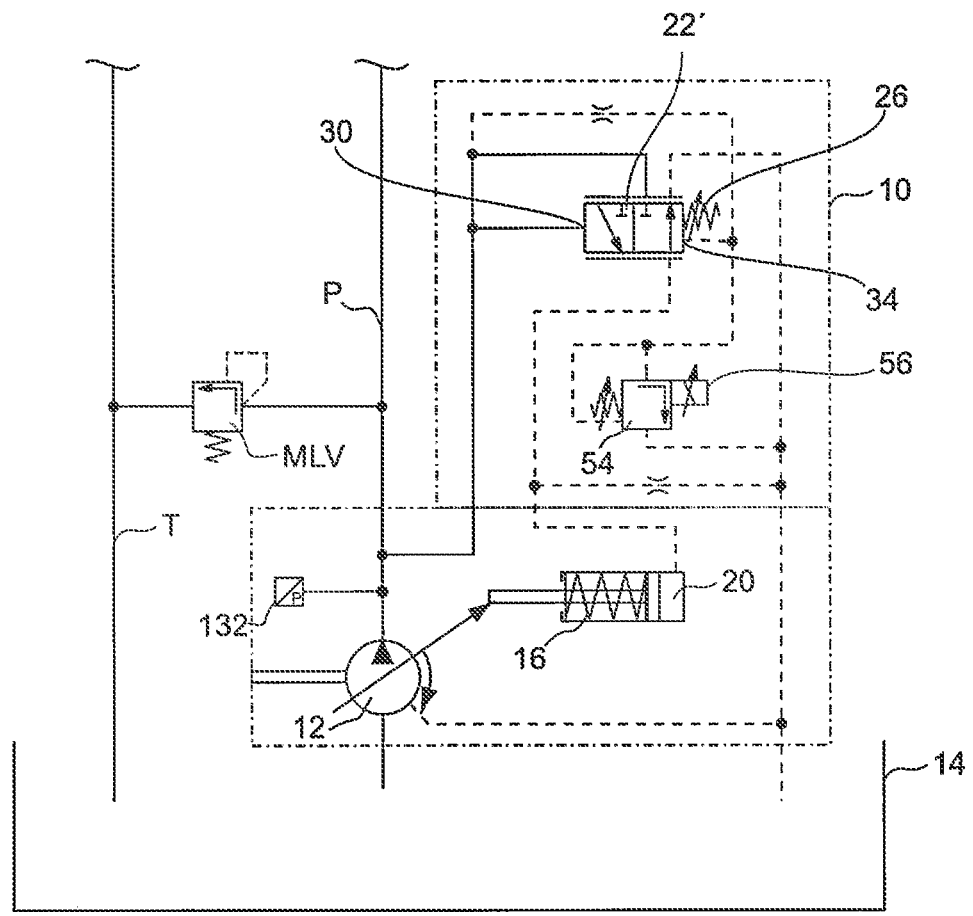
FIG. 3 illustrates how a pump supply including a variable displacement pump can be adapted to incorporate a solenoid-controlled pressure limiting valve for use with an E-LS system.

As illustrated in FIG. 3, the hydraulic supply system may also be provided with a main pressure limiting valve MLV which opens to vent the pump supply P to the tank 69 if the pressure exceeds a predetermined pressure. The MLV is set to open at a pressure above the maximum permitted operating pressure of the system. This provides an additional level of safety in case the limitation of the pump supply pressure PSP through the pump controller should fail. For use with current tractor hydraulic supply systems, the MLV may be set to open a pressure value of around 250 bar, for example. However, the pressure at which the MLV opens can be selected as appropriate for any given system.

The hydraulic supply system 64 illustrated in FIG. 5 is exemplary only and can be modified for use with hydraulic supply systems which have alternative layouts, including an alternative number and type of consumers and control valves. For example, the tractor 60 may have more than one pump and may have a fixed displacement pump in addition to the main pump MP for supplying other consumers such as a lubrication system for the driveline, a transmission (of hydrostatic-mechanical split type) or a hydraulic brake system, for example. These are not shown in FIG. 5 as they are not included in the E-LS control arrangements which are the subject of the present disclosure.

Electronic Network

FIG. 5 also illustrates an electronic control system network 100 for the hydraulic supply system 64. As shown, the control network 100 includes a controller 102 on the tractor having an electronic processor 104. The processor 104 is operable to access a memory 106, which may be part of the controller 102, and execute instructions stored therein to perform the steps and functionality disclosed. The memory 106 may include any one or a combination of volatile memory elements (e.g., random-access memory RAM, such as DRAM, and SRAM, etc.) and non-volatile memory elements (e.g., ROM, hard drive, tape, CDROM, etc.). The memory 106 may store a native operating system, one or more native applications, emulation systems, or emulated applications for any of a variety of operating systems and/or emulated hardware platforms, emulated operating systems, etc. The memory 106 may furthermore store parameters or settings needed to operate the control systems and/or perform the methods as described below.

It should be appreciated by one having ordinary skill in the art that in some embodiments, additional or fewer software modules (e.g., combined functionality) may be stored in the memory 106 or in additional memory. In some embodiments, a separate storage device may be coupled to the data bus, such as a persistent memory (e.g., optical, magnetic, and/or semiconductor memory and associated drives). In a further embodiment, the memory 106 may be connectable with an off-board network architecture (via mobile communication or WLAN) to provide parameters or settings.

The processor 104 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the controller 102.

Electronic communications among the various components of the control network 100, as indicated by the dashed lines, may be achieved over a controller area network (CAN) bus or via a communications medium using other standard or proprietary communication protocols (e.g., RS 232, Ethernet, etc.). Communication may be achieved over a wired medium, wireless medium, or a combination of wired and wireless media.

The controller 102 is in communication with each of the electronic solenoid valve controllers VC of the various valves on the tractor, with the pump output controller 68, and with various user interfaces such as a steering wheel SW, valve rockers represented as UI1 and UI2, a linkage control represented as UI3, and a touch screen TS. The touch screen is typically located within a cab of the tractor to provide information to the driver and receive input (e.g. to select, adjust and/or save settings). The touch screen TS may alternatively be replaced or enhanced by a keyboard to receive input. Indeed, any input or presentation of information whether by manual, speech or gestures may be included herein. Each user interface UI may be permanently assigned to one consumer of the tractor or the implement. Alternatively, one or more of the user interfaces may be variably assignable to any one of two or more consumers by the operator. Such an assignment might be effected via the touch screen, for example.

The controller 102 may also receive further data, such as from a GPS receiver to determine the current position of the tractor, and/or may be operative to control further devices.

The rear implement 62 may also be connected to the tractor controller 102, such as via a standardized agricultural ISOBUS for example, to exchange data and control between the implement and tractor as described below. For this purpose, the implement 62 may be provided with an implement controller 110 which communicates with the tractor controller 102. If present, an controller 110 may have an electronic processor 114 which is operable to access a memory 112 of the implement controller 110 and execute instructions stored therein to perform the steps and functionality disclosed herein.

The memory 112 may include any one or a combination of volatile memory elements (e.g., random-access memory RAM, such as DRAM, and SRAM, etc.) and non-volatile memory elements (e.g., ROM, hard drive, tape, CDROM, etc.). The memory 112 may store a native operating system, one or more native applications, emulation systems, or emulated applications for any of a variety of operating systems and/or emulated hardware platforms, emulated operating systems, etc. The memory 112 may furthermore store parameters or settings needed to operate the control systems as described below.

It should be appreciated by one having ordinary skill in the art that in some embodiments, additional or fewer software modules (e.g., combined functionality) may be stored in the memory 112 or additional memory. In some embodiments, a separate storage device may be coupled to the data bus, such as a persistent memory (e.g., optical, magnetic, and/or semiconductor memory and associated drives). In a further embodiment, the memory 112 may be connectable with an off-board network architecture (via mobile communication or WLAN) to provide parameters or settings.

The processor 114 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the controller 102. Load Sensing Returning to the hydraulic supply system, at any given time, a highest of the load sensing pressure demands LSP from the consumers on the tractor 60 and any attached implements 62 is used to regulate the pump output controller 68 by means of a load sensing LS system. The load sensing system includes an electronic (electrohydraulic) load sensing (E-LS) system including a number of pressure sensors for sensing load sensing pressure demand signals LSP from consumers which are part of the E-LS system. Each of the pressure sensors is in communication with a controller 102 or 110 and forwards to the controller an electronic load sensing pressure signal ELSPS (a pressure signal) representative of the sensed consumer load sensing pressure LSP.

The electronic load sensing pressure signal ELSPS may be an analogue signal in which a characteristic of the signal is modulated in dependence on the pressure of the hydraulic load sensing pressure signal LSP. In an embodiment, the current of the ELSPS is modulated in dependence on the pressure of the hydraulic load sensing pressure signal LSP but in another embodiment it is the voltage. In an embodiment in which the ELSPS is an analogue signal, the controller 102, 110 converts the ELSPS into a pressure value by reference to data stored in the controller (or to which the controller has access) which provides a correlation between the modulated characteristic and pressure for the sensed load sensing pressure LSP. This data may be provided in the form of a characteristic map or a look up table assigned to the sensor. In another embodiment, the pressure sensor has a CPU and communicates with the controller through a CAN interface. In this case, conversion of the analogue signal to a pressure value is made at the sensor and the pressure value forwarded to the controller 102, 110.

In the embodiment illustrated, a first pressure sensor 122 is connected with the LS port LS1 on the CVM, where it is subject to the highest consumer load sensing pressure signal LSP of the valves in the CVM. A second pressure sensor 124 is connected with an LS port LS2 on the RVM, where it is subject to the highest consumer load sensing pressure signal LSP of the valves in the RVM. A third pressure sensor 125 is connected with an LS port LS4 on the cooling fan valve CFV to sense the load sensing pressure of the cooling fan motor.

A fourth pressure sensor 126 on the tractor is connected with a LS coupling 70c of the power beyond interface. On the implement, the LS power beyond coupling may be hydraulically connected with the common LS port LS3 of the IVM so that the highest load sensing pressure demand LSP from the various valves in the IVM is forwarded to the fourth pressure sensor 126 when the implement is coupled to the tractor. However, for implements which have a controller 112, an implement pressure sensor 128 can be connected with the common LS port LS3 of the IVM. In this case, the implement pressure sensor 128 communicates with the implement controller 112 and forwards to the implement controller 112 an electronic load sensing pressure signal ELSPS representative of the sensed consumer load sensing pressure LSP at the IVM common LS port LS3. The implement controller 112 forwards data relating to the sensed load demand pressure LSP to the tractor controller 102. The implement controller 110 may process the load sensing pressure demand data and forward to the tractor controller 102 data which is modified or a signal which is a function of the sensed load sensing pressure signal LSP.

The load sensing pressure demand LSP of the steering system is also sensed electronically to form part of the E-LS system. FIG. 5 illustrates two alternative arrangements. In one embodiment, an LS port LS5 of the steering system actuator/control valve TC1 is hydraulically connected by a LS signal line to an LS input port LS6 on the CVM. The LS input port LS6 is connected with the LS ducts of each of the valves in the CVM to the common LS port LS1 by a suitable cascade of shuttle valves so that the highest load sensing pressure demand LSP from the steering system and the various valves CMV1 To CMV3 is reported to the common LS port LS1 to be sensed by the first pressure sensor 122. In an alternative embodiment, a dedicated pressure sensor 130 is provided to sense the load demand pressure LSP of the steering system. The steering system pressure sensor 130 may be hydraulically connected to the LS port of the steering system and electronically connected to the tractor controller 102 to forward to the controller an electronic load sensing pressure signal ELSPS representative of a sensed consumer load sensing pressure LSP of the steering system.

The tractor controller 102 is configured to select an electronic load sensing pressure signal ELSPS representative of the highest consumer load sensing pressure LSP forwarded to it, either directly from a pressure sensor or from the implement controller 112. The controller processes the selected signal and forwards an electronic pump supply control signal EPSCS to the output controller 68 of the main pump MP to vary the output of the pump MP in dependence on the highest sensed load sensing pressure LSP. If the pump output controller 68 comprises a solenoid-controlled pressure limiting valve 54 as illustrated in FIG. 3, the tractor controller 102 forwards an electronic pump supply control signal EPSCS to actuate the solenoid of the pressure limiting valve 54 in order to vary the output of the main pump. Typically, the current of the electronic pump supply control signal EPSCS will determine the extent of movement of the solenoid and so will determine the pressure $P_{set}$ of the resulting hydraulic pump supply control signal HPSCS applied to the LS port 34 of the flow control valve 22' and hence the supply pressure PSP of the main pump. The resulting pump supply pressure PSP can be calculated by equation 1:

$$PSP = \Delta P_{st} + P_{set} \qquad \text{Equation 1}$$

where $\Delta P_{st}$ is the static or stand-by pressure differential defined by the spring 26 in the flow control valve 22', and $P_{set}$ is the pressure of the hydraulic pump supply control signal HPSCS provided at the LS pressure port of the flow control valve.

If the implement has an electronical controller 110, communication between the tractor controller 102 and electronic components of the LS pressure control system on the implement, such as valve controllers VC and pressure sensors 128 of the IVM, is typically made via the implement controller 110, with data and instructions being transmitted between the implement controller 110 and the tractor controller 102 via a standardized ISOBUS connection.

In an embodiment, the controller 102 converts a target pressure value for $P_{set}$ to a current value for forwarding to the solenoid-controlled pressure limiting valve 54 (or other transducer) as an analogue electronic pump supply control signal EPSCS. In another embodiment, the pump output controller 68 has a CPU and communicates with the controller 102 through a CAN interface. In this case, the controller 102 forwards the target set point pressure value $P_{set}$ to pump controller 66 in an electronic pump supply control signal EPSCS through a CAN interface and the pump CPU converts the pressure value to an analogue signal for controlling the pressure limiting valve 54 or other transducer.

Conversion of the target pressure value for $P_{set}$ to a current value may be made by reference to data which provides a correlation between a current value and the resulting pressure $P_{set}$ generated by the solenoid-controlled pressure limiting valve 54 or other transducer. This data may be stored in, or is otherwise accessible to, the controller 102 or pump controller CPU and may be provided in a characteristic map or a look up table assigned to the valve 54 and/or the pump MP for example. In other embodiments it may be a voltage of the analogue which is modulated to control the output of the solenoid-controlled pressure limiting valve 54.

The pressure sensors, the one or more controllers 102, 110, and the pump output controller 68 can all be considered as part of a control system for the hydraulic supply system.

Pressure Differential Set in Dependence on the Rate of Increase of Load Pressure Demand LSP In accordance with an embodiment, the tractor controller 102 is programmed and configured to control adjustment of the output of the main pump MP in dependence not only on the value of the sensed load sensing pressure LSP but also in dependence on the rate of change of an increasing load sensing pressure demand LSP (referred to as the LSP pressure gradient).

In accordance with a suitable algorithm, the tractor controller 102 determines the LSP pressure gradient of a highest of the load sensing pressure signals LSP forwarded to it by the various pressure sensors in the E-LS network. If the LSP pressure gradient is below a threshold value Tr, the controller 102 regulates the main pump output so that the supply pressure PSP is maintained above the load sensing pressure LSP by a first differential. In an embodiment, the first differential is the stand-by or static pressure differential $\Delta P_{st}$ defined by the spring 26 in the flow control valve 22' and the tractor controller 102 forwards an electronic pump supply control signal EPSCS to the pressure limiting valve 54 calibrated to generate a hydraulic pump supply control signal HPSCS having a pressure $P_{set}$ that is the same as (or equivalent to) the load demand pressure LSP. The resulting pump supply pressure PSP under this circumstance can be derived from equation 1, where $P_{set}$=LSP, so that equation 1 can be re-written as:

$$PSP = \Delta P_{st} + LSP \qquad \text{Equation 2}$$

Accordingly, when the rate of change of an increasing consumer load sensing pressure LSP is below the threshold value Tr, the E-LS system operates broadly in the same manner as a conventional E-LS system. However, when the rate of increase of a consumer load sensing pressure LSP is at or above the threshold value Tr, the controller 102 is programmed and configured to regulate the main pump output so that the supply pressure PSP is maintained above the load sensing pressure LSP by a second differential larger than the first pressure differential $\Delta P_{st}$. The second pressure differential can be considered to be made up of the static or stand-by pressure differential $\Delta P_{st}$ regulated by the spring 26 in the flow control valve 22' plus an additional dynamic pressure differential $\Delta P_{dyn}$ which is applied by the controller 102 through the hydraulic pump supply control signal HPSCS generated by the pressure limiting valve 54. In this case, the tractor controller 102 forwards to the pressure limiting valve 54 an electronic pump supply control signal EPSCS calibrated to generate a hydraulic pump supply control signal HPSCS having a pressure $P_{set}$ that is higher than the load demand pressure LSP by the amount of the dynamic pressure differential $\Delta P_{dyn}$, such that $P_{set}$ is equal to the load demand pressure LSP plus the dynamic pressure differential $\Delta P_{dyn}$ ($P_{set}$=LSP+$\Delta P_{dyn}$). Equation 1 in this case can be re-written as:

$$PSP = P_{st} + LSP + \Delta P_{dyn} \qquad \text{Equation 3}$$

By providing an increased pressure differential when the rate of increase of the load sensing pressure LSP is at or above a certain threshold Tr, the dynamic response of the system is increased. The dynamic pressure differential $\Delta P_{dyn}$ may be applied for a set time period once it is triggered as discussed below.

In a first example, $\Delta P_{st}$ is set at 20 bar, the threshold value Tr of the LSP pressure gradient is set at 5 bar/50 ms (a pressure increase of 5 bar in 50 ms), and the dynamic pressure differential $\Delta P_{dyn}$ is set at 20 bar.

The following tables compare the dynamic performance of a conventional E-LS system and an E-LS system in accordance with the embodiment described above when a consumer valve is opened to produce a consumer load sensing pressure LSP rapidly increasing to 140 bar. Table 1 below illustrates a typical dynamic response of a conventional E-LS control system in these circumstances.

TABLE 1 pressure differential increased by LSP in accordance with prior art

| | | \multicolumn{3}{c}{PSP = $\Delta P_{st}$ + $P_{set}$ (where $P_{set}$ = LSP)} |
|---|---|---|---|---|
| Cycle | Description | $\Delta P_{st}$ (bar) | LSP at start of cycle (bar) | PSP at end of cycle (bar) |
| 1 | Pump pressure is 20 bar, valve is actuated. $P_{set}$ = 20 bar (LSP) is forwarded to pump controller, pump supply pressure is adjusted to 40 bar | 20 | 20 | 40 |
| 2 | Pump pressure is 40 bar, valve is actuated. $P_{set}$ = 40 bar (LSP) is forwarded to pump controller, pump supply pressure is adjusted to 60 bar | 20 | 40 | 60 |
| 3 | Pump pressure is 60 bar, valve is actuated. $P_{set}$ = 60 bar (LSP) is forwarded to pump controller, pump supply pressure is adjusted to 80 bar | 20 | 60 | 80 |
| 4 | Pump pressure is 80 bar, valve is actuated. $P_{set}$ = 80 bar (LSP) is forwarded to pump controller, pump supply pressure is adjusted to 100 bar | 20 | 80 | 100 |
| 5 | Pump pressure is 100 bar, valve is actuated. $P_{set}$ = 100 bar (LSP) is forwarded to pump controller, pump supply pressure is adjusted to 120 bar | 20 | 100 | 120 |
| 6 | Pump pressure is 120 bar, valve is actuated. $P_{set}$ = 120 bar (LSP) is forwarded to pump controller, pump supply pressure is adjusted to 140 bar | 20 | 120 | 140 |
| 7 | Pump pressure is 140 bar, valve is actuated. $P_{set}$ = 140 bar (LSP) is forwarded to pump controller, pump supply pressure is adjusted to 160 bar | 20 | 140 | 160 |

As illustrated in Table 1, at each cycle the pressure $P_{set}$ of hydraulic pump supply control signal HPSCS forwarded to the pump controller is equal to the consumer load sensing pressure signal LSP at that time. In the arrangement illustrated, it takes seven cycles for the system to increase the pump supply pressure PSP to 160 bar as required to maintain the pump supply pressure higher than the final consumer load sensing pressure LSP of 140 bar by the static pressure differential $\Delta P_{st}$.

Table 2 below shows the effect of increasing the pressure $P_{set}$ of the hydraulic pump supply control HPSCS to include a dynamic pressure differential $\Delta P_{dyn}$ of 20 bar when the rate of increase of LSP reaches the threshold value Tr of 5 bar/50 is.

TABLE 2

Pressure differential increased depending on rate of change of LSP

| | | \multicolumn{4}{c}{PSP = $\Delta P_{st}$ + $P_{set}$ (where $P_{set}$ = LSP + $\Delta P_{dyn}$)} |
|---|---|---|---|---|---|
| | | | \multicolumn{2}{c}{$P_{set}$} | |
| Cycle | Description | $\Delta P_{st}$ (bar) | LSP at start of cycle (bar) | $\Delta P_{dyn}$ (bar) | PSP at end of cycle (bar) |
| 1 | Pump pressure is 20 bar, valve is actuated. $P_{set}$ = 20 bar (LSP + $\Delta P_{dyn}$) forwarded to pump controller, pump supply pressure is adjusted to 40 bar | 20 | 20 | 0 (no LSP gradient initially available) | 40 |
| 2 | Pump pressure is 40 bar, valve is actuated. $P_{set}$ = 60 bar (LSP + $\Delta P_{dyn}$) is forwarded to pump controller, pump supply pressure is adjusted to 80 bar | 20 | 40 | 20 (LSP gradient > 5 bar/ 50 ms) | 80 |
| 3 | Pump pressure is 80 bar, valve is actuated. $P_{set}$ = 100 bar (LSP + $\Delta P_{dyn}$) is forwarded to pump controller, pump supply pressure is adjusted to 120 bar | 20 | 80 | 20 (LSP gradient > 5 bar/ 50 ms) | 120 |
| 4 | Pump pressure is 120 bar, valve is actuated. $P_{set}$ = 140 bar (LSP + $\Delta P_{dyn}$) is forwarded to pump controller, pump supply pressure is adjusted to 160 bar | 20 | 120 | 20 (LSP gradient > 5 bar/ 50 ms) | 160 |

It can be seen from Table 2 that increasing $P_{set}$ to include an additional dynamic pressure differential $\Delta P_{dyn}$ when the rate of increase of the load sensing pressure LSP reaches the threshold Tr, fewer cycles (four in this case) are required to increase the pump supply pressure PSP to 160 bar using the methods disclosed. This considerably increases the speed of response of the system in adapting the pump supply pressure PSP to meet a rapidly rising consumer load.

In the above example, once application of a dynamic pressure differential $\Delta P_{dyn}$ has been triggered by the rate of increase of the load sensing pressure reaching the threshold Tr, the dynamic pressure differential $\Delta P_{dyn}$ is applied continuously until the consumer demand is met, that is to say when the pump supply pressure PSP equals the sum of the load sensing pressure LSP, the static pressure differential $\Delta P_{st}$, and the dynamic pressure differential $\Delta P_{dyn}$. However, in an alternative embodiment, the dynamic pressure differential $\Delta P_{dyn}$ is only applied for a limited time period after its application is triggered by the rate of increase of the load sensing pressure LSP reaching the threshold Tr and is then ramped down. The time period over which the dynamic pressure differential $\Delta P_{dyn}$ is applied will be referred to as an application period (AP). Applying a dynamic pressure differential $\Delta P_{dyn}$ for a time limited application period AP has been found to provide a dynamic response to a rapidly increasing load sensing pressure LSP but in a more efficient way than applying a dynamic pressure differential $\Delta P_{dyn}$ continuously. The relatively brief application of a dynamic pressure differential $\Delta P_{dyn}$ gives the pump output supply an initial boost to meet the hydraulic load demand but without over supplying the hydraulic system. The application period AP can be selected to meet system requirements but the applicant has found an application period AP in the range of 50 to 300 ms, or in the range of 80 to 200 ms, or in the range of 90 to 150 ms, or in the region of 100 ms to be effective. The system may be configured to apply a dynamic pressure differential $\Delta P_{dyn}$ for different application periods AP depending on operational requirements, such as for different consumers.

In embodiments in which the dynamic pressure differential $\Delta P_{dyn}$ is applied for a time limited application period AP, the system may also be configured to set a delay period DP following one application of a dynamic pressure differential $\Delta P_{dyn}$ before a subsequent application of a dynamic pressure differential $\Delta P_{dyn}$ is permitted. The application of a delay period DP between applications of dynamic pressure differential $\Delta P_{dyn}$ helps to maintain system stability, reducing the risk that oscillations in a load sensing pressure LSP signal are unduly amplified by the addition of a dynamic pressure differential $\Delta P_{dyn}$. The delay period DP is timed from the point at which a dynamic pressure differential $\Delta P_{dyn}$ is first applied. In other embodiments, the delay period DP is timed from the point at which application of a dynamic pressure differential $\Delta P_{dyn}$ is stopped. Indeed, the delay period DP can be timed from any suitable point in relation to an application of a dynamic pressure differential $\Delta P_{dyn}$. Once the delay period DP has expired, a dynamic pressure differential $\Delta P_{dyn}$ can be applied again for the set application period AP if the operating conditions meet the criteria for application of a dynamic pressure differential $\Delta P_{dyn}$. For example, if at the end of the delay period DP following a one application of a dynamic pressure differential $\Delta P_{dyn}$ the rate of increase of the load sensing pressure LSP is at or above the threshold Tr, the controller 102 will again apply a dynamic pressure differential $\Delta P_{dyn}$ for a further application period AP and a further delay period DP begins. The delay period DP can be selected to meet system requirements but the applicant has found that if the delay period DP is timed from the start of a dynamic pressure differential $\Delta P_{dyn}$ being applied, a delay period DP in the range of 600 to 1400 ms, or in the range of 800 to 1200 ms, or in the region of 1000 ms to be effective. The delay period DP is longer than the application period AP and once a dynamic pressure differential $\Delta P_{dyn}$ has been ramped down, no dynamic pressure differential $\Delta P_{dyn}$ is applied for at least the remainder of the delay period DP. Thus the delay period DP defines a minimum interval between applications of a dynamic pressure differential $\Delta P_{dyn}$.

In other embodiments, once application of a dynamic pressure differential $\Delta P_{dyn}$ is triggered by the rate of increase of the load sensing pressure LSP reaching the threshold Tr, the dynamic pressure differential $\Delta P_{dyn}$ is applied continuously until the rate of rate of increase of the load sensing pressure LSP falls below a threshold value Tr*. This threshold value Tr* may be the same as the threshold value Tr which triggers the application of a dynamic pressure differential $\Delta P_{dyn}$ or it may be a different value. Again, the system may apply a delay period DP following one application of a dynamic pressure differential $\Delta P_{dyn}$ before another application is permitted.

A delay period DP between applications of dynamic pressure differential $\Delta P_{dyn}$ can be adopted in any of the embodiments disclosed herein.

The performance of the hydraulic supply system will be influenced by the choice of dynamic pressure differential $\Delta P_{dyn}$ and threshold value Tr broadly as follows:

1. A higher value for the dynamic pressure differential $\Delta P_{dyn}$ will increase the system dynamics as it leads to a faster reaction time to change the pump supply pressure PSP once the rate of increase of the consumer load sensing pressure LSP has reached the threshold value. A lower $\Delta P_{dyn}$ value would tend to lead to a slower response but perhaps a smoother and less abrupt change in pump supply pressure PSP.
2. Lowering the threshold value Tr will increase system dynamics as it causes the dynamic pressure differential $\Delta P_{dyn}$ to be applied sooner when an increase in load sensing pressure LSP occurs, and a higher threshold will delay application of the dynamic pressure differential $\Delta P_{dyn}$, leading to a less dynamic system response.

Increasing the dynamic pressure differential $\Delta P_{dyn}$ and/or lowering the threshold value Tr of the rate of increase of the load sensing pressure LSP can both be used to provide higher system dynamics. However, use of a lower threshold value Tr is dependent on the ability of the system to sense the load sensing pressure to the tolerances required for reliable control with a smaller threshold value Tr. In view of this it is generally preferred to increase the dynamic pressure differential $\Delta P_{dyn}$ in order to increase the dynamic performance of a hydraulic system. However, a lower threshold value Tr can be used to increase system dynamics if the value selected and the system permits reliable operation.

As both the dynamic pressure differential $\Delta P_{dyn}$ and the threshold value Tr of the rate of increase of consumer load sensing pressure LSP influence the dynamic behavior of the pump adjustment based on consumer load sensing pressure LSP, they are collectively referred to as "LS dynamic parameters".

The actual values for the threshold Tr and the dynamic pressure differential $\Delta P_{dyn}$ are selected as appropriate to any given hydraulic system and the person skilled in the art will be able to establish suitable values by, for example, trial and error. However, in trials with a typical hydraulic supply system on a tractor having a pump MP with a maximum delivery rate of about 229.5 l/min at an engine speed of 2700 RPM and a maximum pump supply pressure of about 230 bar, the applicant has found that a dynamic pressure differential $\Delta P_{dyn}$ in the range of 10 bar to 40 bar and a threshold value Tr in the range of 4 to 10 bar/50 ms are generally suitable. Values outside of these ranges though might also be applicable in some hydraulic systems.

Values for the LS dynamic parameters may be stored in the memory 106 of the tractor controller 102 or be otherwise accessible to the electronic processor 104. LS dynamic parameters may be provided as a default setting permanently saved to the memory 106 or the system may be configured so the values of the LS dynamic parameters can be set or modified via a user interface, such as the touch screen. This would enable the parameters to be input or adjusted by a driver or other user. If the LS dynamic parameters can be input or modified, this would enable a driver to set the LS dynamic parameters to provide a suitable dynamic performance for a particular job or task and/or enable different values for the parameters to be used for different implements. For example, use of a particular implement may be improved by a more dynamic response, whereas a different type of implement may be better suited to a less dynamic response. The ability to vary the value of one or more of the LS dynamic parameters enables the driver to adapt the hydraulic supply system accordingly. In a further alternative, instead of entering respective values for the threshold Tr and/or the dynamic pressure differential $\Delta P_{dyn}$, the system may be configured to operate in different LS modes which may be optionally selected by a user. The system could, for example, be configured to be operable in a "dynamic mode" or an "efficiency mode", with the values of the LS dynamic parameters being set to provide a faster response to increases in consumer load sensing pressure LSP in the dynamic mode and to provide a slower response time in efficiency mode to reduce power consumption. The system may be further configured to enable selection of a "balanced mode" with the values of the LS dynamic parameters set in-between the dynamic and efficiency modes. The use of predefined, selectable modes require less skill and experience by the driver while still providing an ability to customize the hydraulic supply system settings.

In a further optional refinement, the method may utilize more than one threshold value Tr for the rate of increase of load sensing pressure LSP and more than one dynamic pressure differential $\Delta P_{dyn}$ so as to enable a stepped ramp up of the dynamic pressure differential $\Delta P_{dyn}$ depending on the rate of increase of the load sensing pressure LSP. Accordingly, in an embodiment the system may configured to apply a first dynamic pressure differential $\Delta p1_{dyn}$, for example 20 bar, when the rate of increase of the load sensing pressure LSP is at or above a first threshold value Tr but below a second threshold value Tr2, and to apply a higher, second dynamic pressure differential $\Delta P2_{dyn}$, for example 40 bar, when the rate of increase of the load sensing pressure LSP is at or above the second threshold value Tr2. For example, a first threshold value Tr could be set at 5 bar/50 ms and a second threshold value Tr2 set at 10 bar/50 ms. It will be appreciated that the values for T1, Tr2, $\Delta P1_{dyn}$, and $\Delta P2_{dyn}$ mentioned above are illustrative only and that the values used can be selected as desired to suit any particular hydraulic supply system and performance requirements. It should also be appreciated that more than two different dynamic pressure differentials can be utilized and implemented at suitable threshold values for the rate of increase of the load sensing pressure.

In a yet still further optional refinement, different settings for the LS dynamic parameters are adopted depending on the value of the load sensing pressure LSP. For example, a first dynamic pressure differential $\Delta P1_{dyn}$ and/or threshold value Tr for the LSP pressure gradient is/are applied when the load sensing pressure LSP is below a first threshold pressure TP1 and a second dynamic pressure differential $\Delta P2_{dyn}$ and/or threshold value Tr2 for the LSP pressure gradient is/are applied if the load sensing pressure LSP is equal to or above the first threshold pressure TP1. In an embodiment, the LS dynamic parameters may be selected to provide a less dynamic response at higher load sensing pressures. Thus the LS dynamic parameters can be set to provide a fast reaction initially (e.g. to overcome internal inertia in the pump controller when starting to pivot the pump) but then provide a smoother control of the pump supply pressure as the dynamic behavior of the pump increases. This also provides a tiered dynamic response and it will be appreciated that more than two ranges of load sensing pressure LSP in which different LS dynamic parameters are adopted can be defined. In one example, different LS dynamic parameters are applied in two ranges:

Range 1: a first dynamic pressure differential $\Delta P1_{dyn}$, such as 10-20 bar, is applied when the rate of increase of the load sensing pressure is at or above a threshold value Tr of 7 bar/50 ms and the load sensing pressure LSP is below a first pressure threshold TP1, such as 40-45 bar.

Range 2: a second dynamic pressure differential $\Delta P2_{dyn}$, such as 5-10 bar, is applied when the rate of increase of the load sensing pressure is at or above a second threshold value Tr2 of 5 bar/50 ms and the load sensing pressure LSP at or above the first pressure threshold TP1, such as 40-45 bar.

It will be noted that the threshold value Tr of the rate of increase of the load sensing pressure is slightly higher in the first range than the second range. The means that the system will wait for a higher increase per time of the load sensing pressure LSP before applying the first dynamic pressure differential $\Delta P1_{dyn}$. Nevertheless, since the dynamic pressure differential $\Delta P1_{dyn}$ applied in the first range is significantly higher than that applied in the second range, the dynamic response is higher overall in the first range than the second. In tests it has been found that the control system is less prone to oscillation by applying a slightly higher threshold value Tr initially. However, there may be circumstances in which the threshold Tr for the load sensing pressure LSP gradient is the same in all LSP pressure ranges or in which a lower threshold Tr is used for a range in which the LSP pressure is lower than in a later range in which the LSP pressure is higher.

Additional ranges could be added with a second, a third or more threshold pressures TP2, TP3, . . . TPn with a different dynamic pressure differentials $\Delta P23_{dyn}$, $\Delta P4_{dyn}$, . . . $\Delta Pn_{dyn}$ and/or threshold value(s) Tr for the LSP pressure gradient being applied in each range.

In one embodiment, no dynamic pressure differential $\Delta P_{dyn}$ is applied once the LSP reaches a threshold pressure TP. Thus in the above example, in a third range in which the LSP pressure is at or above a threshold value TP2 of 70 bar, no dynamic pressure differential $\Delta P_{dyn}$ is applied regardless of the rate of increase of the load sensing pressure LSP.

The actual values for the dynamic pressure differential(s) $\Delta P1_{dyn}$, $\Delta P2_{dyn}$, the threshold value(s) Tr for the LSP pressure gradient, and threshold pressure(s) TP can be selected to meet system requirements and are not limited to the above examples.

In an embodiment, the controller 102 is configured to require that the conditions for a particular range are met for a set period of time, referred to as a range delay period RDP, before a dynamic pressure differential $\Delta P_{dyn}$ for that range is applied. The range delay period RDP may be in the region of 150 to 450 ms, or in the range of 200 to 400 ms, or in the range of 250 to 350 ms, for example. Thus if the system is operating in range 1 and the load sensing pressure LSP increases to or above the threshold value TP1 indicating a change to range 2, the controller 102 waits for the range delay period RDP to expire before the dynamic pressure differential $\Delta P2_{dyn}$ for range 2 can be applied. During this time delay, no dynamic pressure differential $\Delta P_{dyn}$ is applied to control the output of the pump. If after expiry of the range delay period RDP the conditions for range 2 are still met, the dynamic pressure differential $\Delta P2_{dyn}$ for range 2 is adopted and can be applied if the appropriate threshold Tr2 for the load sensing pressure LSP gradient in that range is met. However, if during the range delay period RDP the load sensing pressure LSP indicates a further change of range, such as back to range 1, a further range delay period RDP is applied from the moment the new range is triggered before the dynamic pressure differential $\Delta P1_{dyn}$ for the new range can be applied.

If the system is configured to apply a dynamic pressure differential $\Delta P_{dyn}$ for a limited application period AP when triggered and to apply a minimum delay period DP between applications of a dynamic pressure differential $\Delta P_{dyn}$, the system can be configured to apply both a minimum delay period DP and a range delay period RDP. In this case, the controller 102 may be configured to apply the delay period DP and the range delay period RDP concurrently should a change of range occur while a delay period DP is still running following an earlier application of dynamic pressure differential $\Delta P_{dyn}$ in the previous range. Typically, the delay period DP will be longer than the range delay period RDP.

To further clarify concurrent running of the delay period DP the range delay period RDP, two examples are considered in which the delay period DP is set to 1000 ms and the range delay period RDP is set to 300 ms. In the examples, a change from range 2 to range 1 takes place after the dynamic pressure differential $\Delta P2_{dyn}$ for range 2 has been applied but before the end of the delay period DP triggered by that application.

In a first example, the change of range takes place 600 ms after the delay period DP began. In this case, the range delay period RDP ends 900 ms after the delay period DP had begun. Accordingly, when the delay period DP expires after 1000 ms, the LS dynamic parameters for range 1 are adopted and the dynamic pressure differential $\Delta P1_{dyn}$ for range 1 can be applied, provided the conditions for range 1 are still met and the rate of increase of the load sensing pressure is at or above the threshold value Tr for range 1 at the time. If the dynamic pressure differential $\Delta P1_{dyn}$ is subsequently applied, this will be applied for the application period AP and a further delay period DP is commenced.

In a second example the change in range takes place 800 ms after the delay period DP has begun. In this case, the delay period DP expires 100 ms before the end of the range delay period RDP. Accordingly, application of the LS dynamic parameters for range 1 is delayed for a further 100 ms after the end of the delay period DP. After the range delay period RDP has expired (1100 ms after the previous application of dynamic pressure differential $\Delta P2_{dyn}$ when the system was operating in range 2) the dynamic pressure differential $\Delta P1_{dyn}$ for range 1 can be applied, provided the conditions for range 1 are still met and the rate of increase of the load sensing pressure is at or above the threshold value Tr for range 1 at the time. If the dynamic pressure differential $\Delta P1_{dyn}$ is applied, this will be applied for the application period AP and a further delay period DP is commenced.

Should a change of range occur during the application period AP, the controller continues to apply the dynamic pressure differential $\Delta P_{dyn}$ until the end of the application period AP. The controller will also concurrently apply the delay period DP and the range delay period RDP before any further dynamic pressure differential $\Delta P_{dyn}$ is applied.

Use of the delay periods in this way helps to maintain system stability when changing between ranges and smooths reaction when a range is maintained.

It is expected that varying the LS dynamic parameters in discreet ranges of load sensing pressure LSP will offer smoother control with less risk of oscillation. However, in some systems, the LS dynamic parameters may be varied in proportion (e.g. a linear or other mathematical relationship) to the value of pressure of the load sensing pressure LSP, at least over a certain range of pressures.

Consumer Specific LS Dynamic Parameters

In the embodiments as described above, the same values of the LS dynamic parameters are applied regardless of which consumer triggers a LS adjustment of the main pump MP output. To add a further level of control, the system is optionally configured to adopt values of the LS parameters that vary in dependence on the consumer that triggers a change in the pump output. This enables the dynamic response of the hydraulic system to be more finely tuned.

For example, consumers located on a rear implement 62 and supplied via the power beyond circuit will be subject to higher losses in the hydraulic supply than consumers on the tractor 60 as they are connected to the pump supply 66 and tank through longer hydraulic lines and quick release couplings. To compensate for this, the system may be configured so that the controller 102 applies values for the LS dynamic parameters which provide for a more dynamic response when an increase in the pump output is triggered by a load sensing pressure LSP from a consumer on the rear implement 62 than when it is triggered by an LSP signal provided by a consumer on the tractor itself. In an embodiment, the controller may be configured to apply different LS dynamic parameter settings when an electronic load sensing pressure signal ELSPS triggering a change in pump output comes from the power beyond pressure sensor 126 or via a rear implement pressure sensor 128 and/or rear implement controller 110 than if the LS load sensing signal comes from the CVM or the RVM, for example.

Furthermore, the steering system SS may also require a more dynamic LS setup to ensure maximum steering capability and fast reaction on receipt of a steering input by the driver. Accordingly, the system can be configured so that the values of the LS dynamic parameters are set to provide for a more dynamic response when an increase in the main pump output is triggered by a LS load sensing pressure LSP change from the steering system actuator/control valve TC1. The values for the LS dynamic parameters adopted for the steering system SS may be different from those used for the power beyond circuit.

In contrast, the cooling fan motor CFM may require a less dynamic setting of the LS dynamic parameters. Generally speaking, the load sensing pressure at the CF LS pressure sensor 125 will increase if the air intake or the heater cores are blocked by debris or crop. However, as the dynamic behavior of the cooling system is more inert due to the physics/reaction of the heat transfer etc., it may not be necessary to choose more dynamic LS dynamic parameter settings as a slower response to an increase in the load sensing pressure can be tolerated. Indeed, the controller may be configured to not apply a dynamic pressure differential $\Delta P_{dyn}$ if the load sensing pressure LSP triggering a change in pump supply output comes from the cooling fan motor control valve CFV.

As noted above, the system may be configured to adopt a particular set of LS dynamic parameters in dependence on which pressure sensor is reporting the change in load sensing pressure LSP which triggers an adjustment of the pump output. This might be appropriate if the pressure sensor is associated with a particular consumer or a group of consumers to which a particular set of LS dynamic parameter settings are assigned. Such an arrangement may be suitable for the power beyond pressure sensor 126, an implement pressure sensor 128 (if present), the cooling fan motor pressure sensor 125, and a dedicated steering system pressure sensor 130 (if present). However, some pressure sensors, such as the first and second pressure sensors associated with the CVM and RVM, report load sensing pressure signals LSP from a number of consumers, some on the tractor some on an attached implement, and which have different dynamic requirements. Accordingly, it is desirable to be able to assign different values for the LS dynamic parameters to various consumers whose load sensing pressure signal LSP is measured by a common pressure sensor.

For example, looking at the consumers controlled by the valves in the RVM, the hydraulic cylinders of the rear linkage system TLC, LLC will be well known by the tractor manufacturer in terms of their dynamic behavior as the drives and pipe length are well specified. Accordingly, LS dynamic parameter settings to ensure a fast response for these can be specified much more exactly by the manufacturer to provide sufficient dynamics but avoid inefficient high pump actuation. Alternatively, it may be a requirement to have smooth or slow reaction e.g. when lifting an implement with the linkage, which may require less dynamic but safer operation. In contrast, the tractor manufacturer may not have sufficient information regarding the dynamic performance of consumers on an implement assigned to the valves RMV3 to RMV5 as the conditions of the hydraulic system of the implement (drives, pipe length) may not be known in detail if they are manufactured by a third party. Further, certain valves in the RVM may be assignable to consumers on different implements. In these circumstances, it might be desirable to use a standard set of LS dynamic parameter settings for valves RMV3 to RMV5 and a dedicated set of LS dynamic parameter settings for valves RMV1 and RMV2. Similar considerations will apply to the CVM when it might be desirable to apply different LS dynamic parameter settings for valves CMV1 and CMV3 than CMV2.

To enable different LS dynamic parameter settings to be applied in relation to consumers which share a common LS pressure sensor, the controller 102 can be configured to use additional or alternative input data to determine which consumer has been activated resulting in an increase of load sensing pressure LSP reported by that pressure sensor.

In one embodiment, the controller 102 evaluates data from the user interface and/or the valve controllers VC to determine which consumer has been actuated giving rise to an increase in load sensing pressure LSP reported by a pressure sensor. For example, in relation to the rear linkage assembly, it is often the case that a dedicated user interface UI3 is assigned to control the lower link cylinder. Accordingly, if operation of the lower link user interface UI3 or the VC of the lower link valve RMV1 is detected within a suitable time frame from an increase of load sensing pressure LSP sensed by the RVM pressure sensor 124, the controller 102 determines that the change in load sensing pressure LSP is attributable to the lower link cylinder/valve and applies LS dynamic parameter settings specifically assigned to the lower link actuator/valve. When more than one consumer is actuated through the same valve manifold at the same time, e.g., RMV3 and RMV4 conjointly, and these are assigned different LS dynamic parameter settings, the controller can be configured to apply the more dynamic settings.

Similar considerations will apply to the CVM when it might be desirable to apply different LS dynamic parameter settings for valves CMV1 and CMV3 than CMV2 and for the steering system when the LS load signal from the steering system is reported through the CVM. Generally, the steering system should always react quickly and the controller can be configured to apply a suitably dynamic settings for the LS dynamic parameters if an increase in load sensing pressure is detected by the CVM pressure sensor 122 and operation of the steering wheel SW or actuation of the steering system control valve TC1 is detected.

If the different LS dynamic parameter settings are assigned to different consumers or groups of consumers, these may be provided as fixed default values or the system may be configured to enable some or all of the settings to be input or adjusted, such as by a user. As discussed previously, the system may be operable in different modes (e.g., dynamic, efficiency, and balanced modes) in which different LS dynamic parameter settings are adopted in each mode. In this case, each mode setting could include different LS dynamic parameter settings for at least some consumers. In an embodiment, a dedicated set of LS dynamic parameter settings assigned to a particular consumer may be used regardless of what mode is selected and the LS dynamic parameter settings for at least one of the other consumers are changed in dependence on the mode.

In an embodiment, an implement 62 may be configured to forward LS dynamic parameter settings for the consumers on the implement or data regarding the dynamic performance of the implement consumers to the tractor controller 102. The LS dynamic parameter settings and/or data may be saved in the memory 114 of a controller 110 on the implement and forward via ISOBUS, for example. The tractor controller 102 may be configured to store a set of LS dynamic parameter values and/or related data which are taken when an implement is connected to the tractor and is recognized via ISOBUS.

In an embodiment, the tractor controller 102 is configured to optimize the LS dynamic parameter settings forwarded from an implement for compatibility with the hydraulic system on the tractor. For example, the tractor controller 102 may be configured to correlate LS dynamic parameter settings forwarded from an implement to the hydraulic supply system, e.g. different settings might be necessary depending on the maximum output of the pump fitted on the tractor. In a particularly preferred arrangement, the implement is configured to forward LS dynamic parameter settings or data which depend on the delivery rate of the pump. In this case, the tractor controller 102 will select the LS dynamic parameter settings for a delivery rate which most closely matches the delivery rate of the pump fitted on the tractor.

Setting LS Dynamic Parameters Based on Dynamic Parameters of Hydraulic Network

In some embodiments, the values of the LS dynamic parameters applied to control the pump supply may be selected or modified at least partly in dependence on the predicted dynamic behavior of the relevant part of the hydraulic circuit.

The dynamic behavior of a hydraulic supply system is affected amongst other things by length of the hydraulic lines, valve characteristics, the characteristics of any couplings, pump configuration (e.g., max. delivery, numbers of pumps etc.), as well as the dynamic performance of the consumers themselves. Taking the relevant information into account, various branches of the hydraulic supply circuit are given a rating or score C indicative of the dynamic performance of the branch. In one embodiment a rating C of 1 to 3 is assigned, with a low rating of 1 indicating a less dynamic (e.g. an inert) response and a high rating of 3 indicating a highly dynamic response. If a branch has a high dynamic rating 3 indicating the branch has an inherently high dynamic response, less dynamic LS dynamic parameter settings which promote efficiency can be adopted to modify the pump output without compromising performance. On the other hand, if a branch has an inherently low dynamic response, indicated by a low C rating of 1, it may be desirable to use LS dynamic parameter settings that will increase or maximize the dynamic response.

If a consumer is located on an implement attached to the tractor, assessment of the dynamic behavior of the system for that consumer may be carried out in respect of two branch parts of the hydraulic supply circuit, a first branch part on the tractor side and a second branch part on the implement side. The tractor side branch part TB will typically include the pump supply and any hydraulic lines and components in the circuit between the pump supply and a connector or coupling to which the implement hydraulic system is attached. On the implement side, the branch part IB would typically include the hydraulic line or lines from the connector to the consumer valve, which may be part of a valve manifold, the consumer valve, any further lines from the valve to the consumer and the consumer itself. The connector will be the power beyond coupling in many cases and the dynamic behavior of the connector should be taken into account. In this regards the connector may be assigned to either the tractor side branch part TB or the implement side branch part IB. Each branch part is given a dynamic behavior rating, which are designated $C_{TB}$ for the tractor side and $C_{IB}$ for the implement side. To provide an overall rating for the whole consumer branch, the ratings for the two branch parts are summed together to provide an overall consumer branch rating $C_{overall}$. This is illustrated in equation 4:

$$C_{overall} = C_{TB} + C_{IB} \quad \text{Equation 4}$$

Using the above rating system in which each branch part is assigned a rating of 1 to 3, the overall rating will range from a low rating of 2, indicating an inert response behavior, and a high rating of 6, indicating a highly dynamic response behavior. As discussed above, if the overall rating for a particular consumer branch is low, it may be desirable to apply LS dynamic parameter settings which promote a more dynamic response to compensate for the inert nature of the branch. Whereas, if the overall rating for a consumer branch is high, indicating that the behavior is inherently dynamic, it may be acceptable to adopt values for the LS dynamic parameters which promote more efficient control of the pump supply without compromising the dynamic performance of the system.

An example will now be described with reference to FIG. 5, looking at how dynamic behavior of the supply system can be rated in respect of the system branch for consumer RIC6 on the rear implement 62.

A first tractor side branch part TB1 includes the main pump MP and the pump supply line P line to the power beyond coupling 70a. The coupling 70a is included in the tractor side branch part TB1 in regards to its impact in terms of the dynamic behavior of the branch.

On the implement side, a first implement branch part IB1 includes the lines from the power beyond coupling 70a to the implement valve manifold IVM, the respective implement manifold valve IMV3 and the further lines to consumer RIC6. The consumer RIC6 is a hydraulic drive and the dynamic behavior of the hydraulic drive is taken into account in rating the dynamic behavior of the implement branch part IB1.

Both branch parts TB1 and IB1 are assessed regarding their hydraulic dynamic behavior and are given respective ratings $C_{TB1}$ and $C_{IB1}$. In this example, the tractor side branch TB1 is given a high rating $C_{TB1}$ of 3, and the implement side branch is given a rating $C_{IB}$ of 1.

The high rating for TB1 in this embodiment is assigned on the basis that the main pump MP provides a high delivery rate, such as in excess of 300 l/min, and the rest of the branch TB1 does not show components which decrease dynamics. However, if the main pump MP had a lower delivery rate, the rating assigned to the tractor side branch might be lower and could be a 2 or even a 1 if a pump MP with a low delivery rate, such as below 100 l/min, is fitted to the tractor. In some hydraulic systems, the pump supply will comprise twin pumps which may both be variable displacement pumps adjustable using one or two pump controllers. In this type of embodiment, the dynamic rating will usually be assessed dependent on the combined delivery rate of both pumps. For example, in a system having a first pump with a maximum delivery rate of 220 l/min and a second pump with a maximum delivery rate of 210 l/min, the combined delivery rate is 430 l/min which would typically be classed as high.

The low dynamic rating for IB1 is assigned on the basis that the hydraulic lines are relatively long and because the hydraulic drive depicted as consumer RIC6 and implement manifold valve IMV3 are rather inert in this example.

When the implement is connected to the tractor, the overall dynamic rating for the consumer branch $C_{overall}=4$. This is towards the middle of the dynamic rating range 2 to 6. In view of this, the LS dynamic parameters are set to a medium dynamic setting in respect of the consumer RIC6.

If the tractor is equipped with a pump MP with a lower delivery rate so that $C_{TB1}=1$, the overall rating for the consumer branch $C_{overall}$ would be 2. In this case, LS dynamic parameters may be assigned for consumer RIC6 which are at or towards the maximum dynamic setting to overcome the inert behavior of hydraulic supply system for this consumer.

It should be noted that dynamic performance is not always directly related to the delivery output of the pump but needs to be considered in relation to the dynamics of the branch as a whole. Generally speaking, if a pump is supplying a consumer requiring a high volume flow and/or over long hydraulic lines, a pump with a larger delivery rate will provide a more dynamic response than one with a lower deliver rate. However, if a pump is supplying a consumer over relatively short hydraulic lines and/or if the consumer requires a low volume flow (e.g. small volume hydraulic cylinders), the dynamic behavior may be better when supplied by a smaller pump. This is due in part to smaller pumps reacting more quickly to a pump output adjustment than a larger pump as their pump adjustment mechanisms tend to have lower inertia. This situation might typically apply to consumers on the tractor if the hydraulic lines are shorter than those to a consumer on an attached implement.

Other consumer branches within the hydraulic supply system may show different ratings for dynamic behavior and suitable LS dynamic parameter settings can be assigned to each of the respective branches.

The dynamic ratings may be determined by the manufacturer of the tractor and the implement during testing in the development process. Alternatively, the system may be configured to enable ratings to be set later, such as by a user or distributor.

In an alternative embodiment, the system may be configured to assess or learn the dynamic behavior of at least one or some of the consumer branches and assign suitable dynamic ratings and/or LS dynamic parameter settings for those consumer branches. The controller 102 in this case may be programmed to run suitable algorithms to determine the dynamic behavior of consumer branches based on measured values indicating dynamic behavior. This may comprise an assessment of reaction time in response to an increasing LS load sensing pressure LSP demand monitored by the controller. The controller being programmed to use such data in a suitable algorithm to evaluate the dynamic behavior of the consumer branch and modify the LS dynamic parameter settings as appropriate. The modified settings for any given branch may be saved to memory for subsequent application and/or adopted in a modified model used to control pump supply pressure. If the modified settings apply to a particular implement, the controller can be configured to store and use the modified setting when use of that implement is detected or a user provides an input indicating that that implement is in use.

It will be appreciated that if the controller is configured to automatically test the dynamic performance of parts of the hydraulic system and modify the LS dynamic settings accordingly, the controller may not actually assign a dynamic behavior rating for a consumer branch as described above but may use data from an assessment of dynamic behavior to modify the LS dynamic parameter settings directly. The use of dynamic behavior ratings is helpful when data regarding dynamic behavior is provided from different sources. For example, it provides a convenient way for an implement manufacturer to provide dynamic behavior data to a tractor manufacturer or which may be communicated from a controller 110 on an implement 62 to the controller 102 on the tractor.

Automatic Adaptation of LS Dynamic Parameters

In an embodiment, the controller 102 is programmed to use one or more algorithms to adapt the LS dynamic parameter settings automatically. In such an arrangement, target values may be defined for at least one operational target or parameter. Examples of operational targets might include a desired time limit by which a certain pump supply pressure PSP is achieved depending on the sensed load sensing pressure demand LSP. The controller may be enabled to permanently adapt the LS dynamic parameter settings for a given consumer. For example, if for a particular consumer the ideal value is to adjust the pump supply pressure PSP to match a load sensing pressure of such as 100 bar within 200 ms, the system measures the change in pump supply pressure PSP values against time and adapts the LS dynamic parameter settings (e.g. increases the dynamic pressure differential $\Delta P_{dyn}$) to enable the target to be met. The adapted settings may be stored, such as in a lookup table, in a memory accessible to the controller from which they can be subsequent recalled and/or applied in respect of that consumer and/or under certain operating conditions.

Thus, in a self-learning system, the controller may compare the set value of the pump supply pressure PSP and the response of the LS system to adjust LS dynamic parameter settings. The controller may be programmed to apply a time limit for meeting the set pump supply pressure PSP. If the time limit is exceeded the controller changes the LS dynamic parameters to a more dynamic setting (e.g. by increasing the dynamic pressure differential $\Delta P_{dyn}$). This may be an iterative process and the settings derived can be stored in memory for a particular combination of tractor and implement for subsequent use when that particular tractor/implement combination is detected or input by a user. The controller may be configured to update a model used to control the pump supply pressure with LS dynamic parameter settings derived during runtime.

In an embodiment, the system is additionally or alternatively configured to take into consideration actuation of a consumer UI to adapt the LS dynamic parameter settings for the consumer assigned to that UI. If the UI is operated in a manner that demands a faster or greater actuation of the consumer, then the controller may apply a more dynamic setting for the LS dynamic parameters (e.g. a higher dynamic pressure differential $\Delta P_{dyn}$) than if a slower or smaller actuation is requested. If the UI is a rocker switch for example, the degree and/or speed of movement of the rocker may be monitored. Alternatively, the output signal from the UI may be analyzed to determine the size and speed of the requested actuation. By recording a UI input (in terms of deviation or actuating speed), the system can be enabled to recognize a similar UI input and apply suitable LS dynamic parameters as previously determined.

Predictive Pump Adjustment

In hydraulic supply systems on agricultural machines such as tractors, it is known to increase pump delivery automatically when a consumer demand is predicted or initially detected without considering the load sensing pressure LSP. This results in a fast response but may decrease efficiency.

In some embodiments, a control system of the hydraulic supply system is configured to increase the pump supply in dependence on a determination that a consumer demand is expected and to subsequently adjust the pump supply pressure PSP in dependence on the determined rate of increase of the load sensing pressure LSP.

In embodiments the control system is configured to subsequently adjust the pump supply pressure PSP in dependence on a consumer load sensing pressure LSP if: a) a rate of change of the detected load sensing pressure LSP is at or below a threshold value; b) a rate of change of the detected load sensing pressure LSP shows a general decrease indicative that the hydraulic demand of the at least one of the consumers will be met within a given time limit; c) the pump supply pressure PSP is determined to be at least within a pre-determined percentage of the required load sensing pressure LSP; or d) if the detected load sensing pressure LSP as at or above a threshold value.

The pre-determined percentage of load sensing pressure LSP in option c) may be 80%, or 90%, or 95%, or 100%. Thus, the control system may switch to load sensing control of the pump supply when the pump supply pressure is at or above the load sensing pressure or when it is approaching the load sensing pressure.

In an embodiment the control system is configured to change to a load-sensing-based adjustment after a set time limit if such a change has not been triggered prior to the end to the time limit. This provides a fallback position to ensure a switch to load-sensing-based control in the event the pump supply is unable to meet the load sensing demand rather than maintaining a high pump output.

In an exemplary embodiment, the controller 102 is configured to set the pump supply to a high delivery rate immediately when activation of a consumer is first determined, e.g. when a consumer UI is activated, and, if the rate of increase of load sensing pressure LSP from that consumer falls below a threshold value T, such as 2 bar/50 ms, indicating that that the pump supply is reaching a level to meet the demand of the consumer(s), the controller proceeds to regulate the output of the pump supply in dependence on the rate of increase of load sensing pressure LSP and apply a dynamic pressure differential $\Delta P_{dyn}$ when appropriate as described above in relation to the previous embodiments. Instead of considering the shortfall of a threshold value T, the controller may alternatively proceed to regulate the output of the pump supply in dependence on the rate of increase of load sensing pressure LSP when rate of increase of load sensing pressure LSP shows a general decrease indicating that the pump supply will soon meet the consumer demand.

In an alternative approach, the pump is initially controlled to raise the pump supply pressure PSP when activation of a consumer is first determined and in parallel controller 102 monitors the load sensing pressure signal LSP from the consumer. If the load sensing pressure signal LSP does not change (e.g. the rate of increase of the load sensing pressure is at or close to zero) and the pump supply pressure PSP is at least close to, at or above the LSP (indicating that the pump is more than capable to meet the demand), this system may return to a LS based pump adjustment.

In a further approach, the pump supply may be controlled to provide a high delivery rate for a certain time period before LS control using the load sensing pressure LSP is introduced.

These types of predictive pump adjustment protocols can be applied for all consumers or only selectively applied for one or more specific consumers. For example, these types of protocol might be adopted when a consumer requiring a fast response, such as the steering system SS, is activated but not adopted when a consumer, such as the cooling fan motor which does not generally require a fast response, is activated.

The controller 102 can be configured to monitor various operational parameters to determine when a particular consumer has been actuated and that an increased hydraulic load demand can be expected. In an embodiment, the controller 102 is configured to receive and/or monitor data/signals from the UI and/or valve controllers VC for at least some of the hydraulic consumers. Such data/signals are indicative of an actuation state of the consumers and the controller 102 is programmed to determine from the received/monitored data/signals when a consumer has been or is being actuated. In a further refinement, the controller may be configured to enter a predictive mode of control for a particular consumer in dependence on parameters of a control signal/data from a user interface UI for that consumer. Thus, the controller 102 may be configured to enter a predictive mode of pump supply control if the control signal/data from the UI reaches a predetermine threshold value (indicative of the amount of deviation of the UI) or if the rate of change of the control signal (indicative of the speed of actuation of the UI) reaches a predetermined threshold value. For example, in respect of the steering system, the controller 102 could be programmed to enter a predictive mode of control of the pump supply if the steering wheel is turned through a given angle and/or at or above a given rotational speed.

Predictive pump supply adjustment as described above can be combined with self-learning techniques such as those described in the section headed Automatic Adaptation of LS Dynamic Parameters so that the system is configured to "learn" an appropriate predictive pump supply adjustment based on a UI input by optimizing the setup values to meet an operational target. By recording a UI input (in terms of deviation or actuating speed), the system can be enabled to recognize a similar UI input and apply a particular set point for the pump supply pressure which meets the operational target efficiently. This may, for example, be a lower set point pump supply pressure than is used initially when entering the predictive mode of control for the particular consumer. For example, in response to a first UI input for a particular consumer, the controller 102 may adjust the pump supply pressure to a first set point which is relatively high and monitor the pump supply pressure PSP against the actual load sensing pressure demand of the consumer arising as a consequence of the UI input. If the controller determines that the pump supply pressure PSP exceeds the highest actual consumer load sensing pressure LSP reported by an amount outside of preset tolerances, the controller may set the highest actual reported load sensing pressure as a predicted load sensing pressure for that UI actuation and apply this setting to determine a revised set point for the pump supply pressure when a predictive adjustment of the pump supply is subsequently trigged for the same or a similar UI input.

Alternatively, the operational target may be a set time limit for response of the particular consumer. Thus, the target may be a set time limit for the consumer to respond to its actuation. Data from one or more sensors arranged to determine response of the consumer is provided to the controller and the controller 102 configured to automatically adjust the set point for the pump supply pressure so as to meet the set time limit using the lowest possible pump supply pressure PSP. If the consumer is an actuator which moves a component, a sensor or sensors may be arranged to detect movement of the component as indicative of the response of the consumer.

The system may also be configured to be self-learning by comparing the set values of the pump supply pressure PSP and the response of the LS load sensing pressure signal LSP to adjust setting of the LS dynamic parameters.

The controller may be configured to update a model used to control the pump supply pressure with set points for the pump supply pressure and/or LS dynamic parameter settings derived during runtime. The settings learned may be stored for a combination of tractor/implement for subsequent use when that tractor/implement combination is detected or input.

Additional Electronic Stand-By Pressure Differential

In the embodiments described above, the stand-by pressure differential $\Delta P_{st}$ is wholly set hydro-mechanically by the spring 26 in the flow control valve 22' and can be designated as a mechanical stand-by pressure differential $M-\Delta p_{st}$. This mechanical stand-by pressure differential $M-\Delta P_{st}$ is applied at all times when the pump is being driven, including while the engine is being started.

In a further embodiment, the E-LS system is configured to apply an additional hydro-electronically defined stand-by pressure differential $E-\Delta P_{st}$ to increase the overall stand-by pressure differential $\Delta p_{st}$. This can be designated as an electronic stand-by pressure differential $E-\Delta P_{st}$. In order to produce the electronic stand-by pressure differential $E-\Delta p_{st}$, the controller 102 sends an electronic pump supply control signal to the pressure limiting valve 54 to generate a hydraulic pump supply control signal HPSCS having a pressure $P_{set}$ at the LS port 34 of the flow control valve 22' which causes the pump supply pressure to be raised at least by the amount of the $E-\Delta P_{st}$.

The controller 102 may be configured to apply the electronic stand-by pressure differential $E-\Delta P_{st}$ at all times even when there is no load sensing pressure LSP. Thus, when the pump is running but there is no load sensing pressure, $P_{set}$ will be equal to the electronic stand-by pressure differential $E-\Delta P_{st}$. The resulting pump supply pressure PSP can be calculated by equation 5:

$$PSP = M-\Delta p_{st} + E-\Delta P_{st} \qquad \text{Equation 5}$$

where M–$\Delta P_{st}$ is the mechanically defined stand-by pressure differential defined by the spring 26 in the flow control valve 22', and E–$\Delta P_{st}$ is the electronically defined stand-by pressure differential.

When a load sensing pressure LSP arises and is forwarded to the controller 102, the controller will increase $P_{set}$ to include the electronically defined stand-by pressure differential E–$\Delta p_{st}$, the load sensing pressure LSP, and any dynamic pressure differential $\Delta p_{dyn}$ as appropriate depending on the rate of increase of the load sensing pressure LSP as described above. The resulting pump supply pressure PSP can be calculated by equation 6:

$$PSP = M - \Delta p_{st} + E - \Delta P_s + LSP + \Delta P_{dyn} \qquad \text{Equation 6}$$

where M–$\Delta P_{st}$ is the mechanically defined stand-by pressure differential defined by the spring 26 in the flow control valve 22', E–$\Delta p_{st}$ is the electronically defined pressure differential, LSP is the load sensing pressure forwarded from a consumer, and $\Delta P_{dyn}$ is the dynamic pressure differential applicable depending on the rate of increase of the LSP.

The electronic stand-by pressure differential E–$\Delta P_{st}$ is applied to raise the overall stand-by pressure differential and could be applied whenever the engine is running or in response to an LSP from one or more consumers. In an embodiment, an electronic stand-by pressure differential E–$\Delta P_{st}$ is applied when a load sensing pressure LSP from a consumer on an attached implement is detected to compensate for losses in the system due to the long hydraulic lines but is not dependent on the rate of change of the LSP.

In an embodiment, the controller 102 is configured to apply the electronic stand-by pressure differential E–$\Delta P_{st}$ only once the engine of the tractor is determined to be running normally but not during engine start up. In an embodiment, the controller 102 is configured to apply the electronically defined stand-by pressure differential E–$\Delta P_{st}$ once a condition, or a set of conditions, is/are met which indicate that the engine has started and is running properly. In an embodiment, the controller 102 is configured to apply the electronic stand-by pressure differential E–$\Delta P_{st}$ once the engine RPM exceeds a set speed for a set period of time, such as 400 R/min for more than 4 seconds for example. The controller may receive or be configured to monitor data relating to engine speed from one or more sensors, e.g., an engine speed sensor, (indicated schematically at 103 in FIG. 5) to determine when the engine has started and is running sufficiently for the electronic stand-by pressure differential E–$\Delta P_{st}$ to be applied.

Pump Control Integrated In Headland Assistance

LS based adjustment of the pump supply is inherently reactive as the pump supply is only increased once a load sensing pressure LSP, or an increase in a load sensing pressure, has occurred, been detected by the E-LS system and the pump supply adjusted. However, often tractors are required to undertake repetitive tasks in which the same sequence hydraulic functions are repeated a number of times. Such a situation arises when a tractor is working in a field (referred to also as a working area) and has to repeatedly actuate hydraulic consumers each time the tractor turns as part of a headland sequence at either end of the field (also referred to as a headland area). For example, it may be necessary to raise an implement attached to the rear of the tractor to enable the tractor and implement to carry out a headland turn and then lower the implement before starting the next run across the field. These sequences are typically automated using a headland control system or headland management system. In general, a headland control system includes a programmable controller 102 which stores in a memory (or has access to) a pre-defined sequence of commands for automatically controlling actuators of the mobile agricultural machine and/or an attached implement to execute a sequence of operations as part of a headland maneuver. This sequence of operations will be referred to herein as a "headland sequence". Once a headland maneuver has been initiated, the controller 102 generates control signals for executing the headland sequence. The controller 102 may be a dedicated controller or it may also control other aspects of the tractor. The control functions could also be shared by a number of controllers in communication with one another. The controller or controllers 102 may be part of an overall control system for the mobile machine and attached implement. In an embodiment the same controller or controllers 102 are used to control a headland sequence and the electronic load sensing functions of the hydraulic supply system.

In some systems, the sequence of controls is carried out by the driver once and recorded so that they can be rerun on demand. Alternatively, a sequence may be defined or adapted manually, even off-board and transferred to the tractor.

In known headland control management systems, there are currently four known tiers of operation:
1. In a first tier, the driver has to manually initiate the recorded sequence at an appropriate time, such as by pushing a START button.
2. In a second tier, the sequence is activated automatically in dependence on a position signal coming from a guidance system which indicates that the tractor is in or approaching the headland.
3. In a third tier, the control system is configured to automatically control movement of the tractor into and through the headland so that the tractor turns without driver's input. In this tier, the driver is present on the tractor to monitor the operation.
4. In a fourth tier, an autonomous machine operates in a manner similar to tier 3 but without a driver present. For autonomous operation, it is very important, due to the absence of the driver, to use operational settings which provide optimized efficiency.

During a headland maneuver, there is often an increased demand from the pump supply. Typically, the tractor will be required to turn as fast as possible requiring a fast response from the steering system SS. In addition, there may be a requirement to raise an implement attached to the tractor, such as a plow, and/or to activate hydraulic actuators on an attached implement to place it is a suitable condition for performing a headland turn.

In some embodiments, the pump supply output is predictively regulated as part of the headland sequence. This temporally overrides or modifies the load sensing mode of control of the pump supply pressure, enabling the pump supply to meet an expected (predicted) hydraulic consumer load arising as the headland sequence is executed. In an embodiment, the pump supply is adjusted to increase the pump supply and pump supply pressure PSP before an increase in load sensing pressure LSP is detected and/or the relevant hydraulic consumer(s) activated. This is particularly advantageous as the hydraulic demands arising during a headland maneuver are known, or can be measured during an execution of the sequence, allowing for the pump supply to be adjusted pre-emptively rather than reactively as is the case with load sensing based adjustment.

In this context, it should be understood that terms such as "predictively" used in relation to adjustment of the pump supply refer to the fact that the pump supply pressure is adjusted, usually increased, before a hydraulic load demand has actually arisen or at least prior to one being sensed by the E-LS system. Similarly, reference to a "predicted" hydraulic demand should be understood as relating to an expected or anticipated hydraulic demand of a headland sequence. This might be determined by measuring the actual hydraulic load demand arising when a headland sequence is first carried out and stored for use when the headland sequence is subsequently initiated.

In an embodiment, the controller 102 is configured to compute and generate an electronic pump supply control signal EPSCS which is forwarded to the output controller 68 of the main pump MP to pre-emptively increase the pump supply pressure to meet the expected hydraulic load demand in a headland sequence prior to an increase in load supply pressure LSP or activation of the relevant hydraulic actuator (s) being detected. This increases the dynamic responsiveness of the system, providing increased steerability while also meeting other hydraulic demands arising as part of the headland sequence. Such an arrangement can be adopted regardless of whether the headland sequence is initiated manually by a driver in accordance with tier 1 or automatically in accordance with tiers 2 to 4.

In an embodiment, the controller 102 is configured to compute and generate an electronic pump supply control signal EPSCS which is forwarded to the output controller 68 of the main pump MP to pre-emptively increase the pump supply pressure to meet the highest (maximum or peak) hydraulic load demand expected to arise during a headland sequence prior to an increase in load supply pressure LSP or activation of the relevant hydraulic actuator(s) being detected.

In an embodiment, the controller 102 is configured to monitor hydraulic load sensing pressure LSP and pump supply pressure PSP and to revert to a load sensing based control of the pump supply during the headland maneuver, provided certain operating conditions are met. In an embodiment, the controller 102 is configured to revert to a load sensing mode of control for the pump supply output if the actual pump supply pressure (e.g. as measured by the pressure sensor 132 and reported to the controller 102) is higher than the highest predicted consumer demand of the headland maneuver sequence and higher than the highest load sensing pressure LSP reported to the controller at the time. This indicates that the pump supply pressure PSP is sufficient to meet the expected hydraulic demands of the headland maneuver sequence and so load sensing control can be commenced to maintain efficiency. Alternatively, load sensing control of the pump supply may be reinstated after a set time limit, at a predetermined point within the headland sequence (e.g. after a peak hydraulic demand as passed), or once the headland sequence has been completed.

This can be adopted in systems in which the controller 102 is not configured to adjust the pump supply pressure PSP in dependence on the rate of change of the load sensing pressure. However, if the controller 102 is configured to adjust the pump supply pressure PSP in dependence on the rate of change of the load sensing pressure, the controller 102 may be configured to apply particular values for the LS dynamic parameters if load sensing control of the pump supply is initiated during the headland maneuver. This enables the dynamic response of the hydraulic system to be tailored to the hydraulic demands of the headland maneuver sequence. In an alternative embodiment in which the controller 102 is configured to adjust the pump supply pressure PSP in dependence on the rate of change of the load sensing pressure, rather than pre-emptively increasing the pump supply pressure, more dynamic settings for the LS dynamic parameters are adopted during the headland sequence allowing the pump supply to be adjusted using the LS system more quickly to meet the hydraulic demands of the headland sequence.

In an embodiment, the controller 102, is configured to automatically adapt control of the pump supply for a given headland sequence by monitoring one or more operational parameters during execution of the headland sequence to determine if the operational parameter meets an operational target associated with at least one consumer actuated as part of the sequence. This may be an iterative process.

For example, the controller may initially determine a predicted consumer load of the headland sequence and set the pump supply pressure PSP to a first set point to meet this predicted consumer demand the first time the headland sequence is initiated. During execution of the headland sequence, the controller monitors the pump supply pressure PSP against the actual load sensing pressure demand. If the controller determines that the pump supply pressure PSP either exceeds or fails to meet the highest actual consumer load sensing pressure LSP reported during the headland sequence by an amount outside of preset tolerances, the controller may set the highest actual reported load sensing pressure as the predicted load sensing pressure and apply this setting to determine a revised set point for the pump supply pressure when the same headland sequence is subsequently repeated.

Alternatively, the operational target may be a set time limit for response of a particular consumer, such as the steering system SS. Thus, the target may be a set time limit for the steering system to turn the steered wheels through a particular steering angle. Data from one or more sensors arranged to determine response of the consumer is provided to the controller and the controller configured to automatically adjust the set point for the pump supply pressure applied on subsequent initiations of the headland sequence so as to meet the set time limit using the lowest possible pump supply pressure PSP.

The adapted settings may be stored, such as in a lookup table, in a memory accessible to the controller 102 from which they can be subsequently recalled and/or applied in respect of a particular headland sequence. The controller may be configured to update a model used to control the pump supply pressure during a headland sequence with settings derived during runtime.

Exemplary embodiments of two headland sequences will be described with reference to FIGS. 6 to 10.

In a first embodiment described with reference to FIGS. 6 to 8, a tractor 60 is towing a rear implement 62 in the form of a plow 163 as illustrated in side view schematically in FIG. 6.

The plow 163 comprises the following main components, whereby reference is also taken to the hydraulic supply system as shown in FIG. 5 and described above:

A main frame 163a including ground wheels 163b to support the weight. The position of the rear wheels is adjustable to vary the height of the rear end of the plow. The main frame 163b and the lower links LLC between them determine the depth of ground engaging members of the plow and are used to lift the ground engaging members out of the ground when traversing a headland area. The relative distance between the ground wheels 163b and the frame 163a can be adjusted by a hydraulic cylinder indicated as consumer RIC1 in FIG. 6.

A plowshare frame 163c with ground engaging means such as a coulters or plowshares 363d to loosen and turn the uppermost soil bringing fresh nutrients to the surface while burying weeds and crop remains to decay. The plowshare frame 163c is rotatably connected to the main frame 163a to enable the plowshares 163d to be turned about an angle of 180° in longitudinal direction. This is required to turn the soil in the consistent direction even if the tractor 60/plow 163 passes the field in opposite directions. The plowshare frame 163c is rotated by a hydraulic cylinder indicated as consumer RIC2 in FIG. 6.

Figure 6:
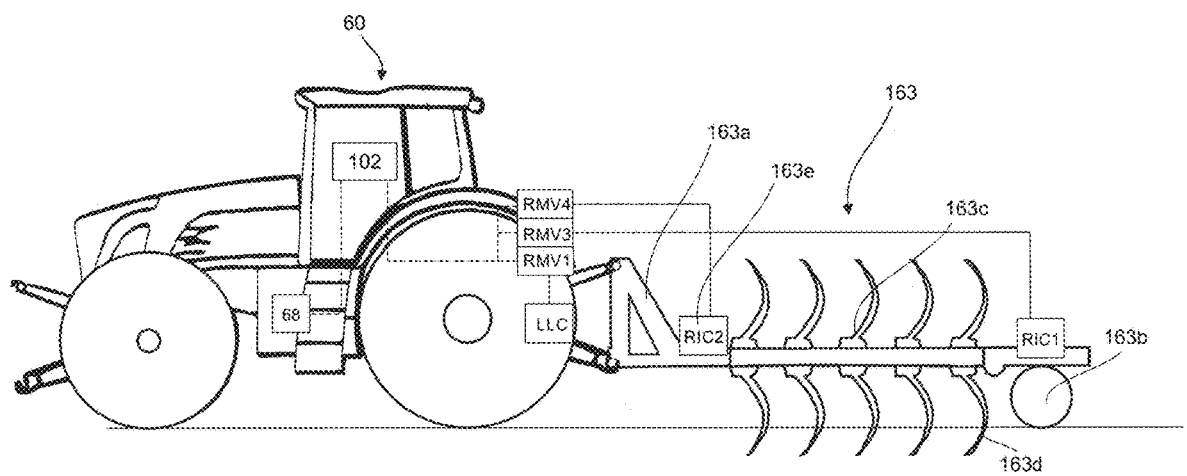
FIG. 6 is a schematic side view of an agricultural machine and a rear implement in form of a plow.

Regarding the hydraulic drive system used on the plow 163, the plow consumers RIC1 and RIC2 are supplied by hydraulic valves of the rear manifold RVM indicated as RMV3 and RMV4 in FIGS. 5 and 6. The lower links LLC are supplied by rear manifold valve RMV1.

Figure 7:
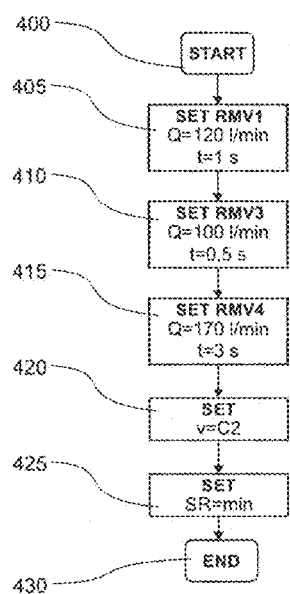
FIG. 7 is a flow chart depicting a storable headland sequence for use with an implement as shown in FIG. 6 according to prior art.
Figure 8:
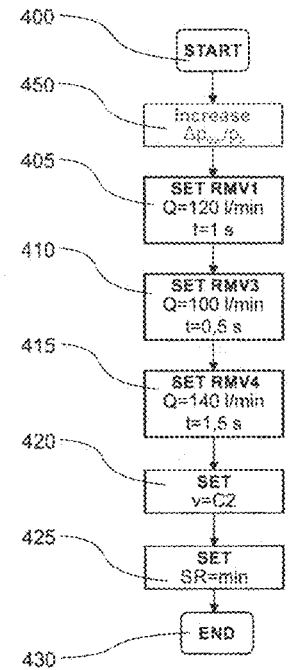
FIG. 8 is a flow chart depicting a storable headland sequence for use with an implement as shown in FIG. 6.

A suitable headland sequence for a plow 163 such as that illustrated in FIG. 6 according to prior art is depicted in a flow chart in FIG. 7 with the following steps:

The sequence starts with step 400 when the headland sequence is activated. The sequence may be activated manually by a driver in accordance with tier 1 or automatically in accordance with any of tiers 2 to 4, such as when the tractor controller 102 determines that the tractor passes a headland area boundary based on GPS data and a field map.

At step 405 rear manifold valve RMV1 is set to a delivery rate of Q=120 l/min for 1 second to lift the lower links LLC and raise the front end of the plow.

At step 410 rear manifold valve RMV3 is set to a delivery rate of Q=100 l/min for 0.5 seconds to raise the rear end of the plow by means of ground wheels 163b.

At step 415 rear manifold valve RMV4 is set to a delivery rate of Q=170 l/min to rotate the plowshare frame 163c about an angle of 180° in the longitudinal direction.

At step 420, the vehicle speed is set to a second value C2 stored in the controller 102. Depending on the operating conditions, C2 may be lower or higher than a first stored value C1 used during plowing.

At step 425, the steering ratio is set to reduced value which means that a small turn on the steering wheel results in a relatively large steering angle at the steered wheels. This enables quick turns. During plowing, a higher steering ratio is mostly preferred to avoid unintended steering when the tractor and plow are traversing the field in a straight line.

The headland sequence ends at step 430.

Further steps may integrated in a headland sequence for a plow but are not discussed here as they are not considered relevant to the hydraulic supply system.

The above-described headland sequence places the plow 163 in a suitable configuration to perform a headland turn. When the tractor and plow have finished the headland pass a similar sequence but in reverse can be used to place the plow in a suitable configuration start a further plowing run across the field. Different parameters may be selected (by driver or automatically) to set the plow for field work again.

During plowing, hydraulic demand is generally constant but during the headland sequence described above, the consumers LLC, RIC 1 and RIC2 are actuated increasing increased hydraulic supply. This results in an increase of the load sensing pressure signal LSP which triggers an adjustment of the pump output to increase delivery. However, using conventional E-LS systems there is a delay before pump output is increased to fully meet the demand. This delay adds to the overall operation time for the headland sequence so that a headland turn takes longer.

The headland sequence described above is adapted as illustrated in FIG. 8. While steps 400, 405, 410, 415, 420, 425 and 430 remain the same as already described with reference to FIG. 7, additional step 450 is added. As part of the headland sequence, at step 450 prior to step 405, the tractor controller 102 adjusts the pump control to provide a more dynamic supply. This may happen in two different ways:

1. The pump pressure PSP is set to a predetermined value. This can be seen as a predictive adjustment in which the pump supply pressure is initially raised without reference to the load sensing pressure. The control system may revert to a load sensing mode of control in which the pump supply is regulated in dependence on a load sensing pressure signal LSP after a predetermined time period or based on any other parameter indicating that the hydraulic supply is sufficient to meet the hydraulic demands of the headland sequence.
2. Alternatively, if the control system is configured to regulate the pump supply based on the rate of increase of a load sensing pressure LSP as described above, the tractor controller may be configured when a headland sequence is activated to adopt values of the LS dynamic parameters (the dynamic pressure differential $\Delta P_{dyn}$ and/or the threshold value Tr of the rate of increase of consumer load sensing pressure LSP) which provide a faster more dynamic response to the consumer demand in the headland maneuver coming via the load sensing system LS.

As a consequence, when step 405 is proceeded, the hydraulic supply is predictively increased or follows the load sensing pressure signal LSP more dynamically so that a reduced operation time for the headland sequence can be achieved to pass the headland in shorter time.

A second exemplary embodiment will be described with reference to FIGS. 9 and 10. In this embodiment, a front implement in the form of a front packer 262 is attached to the tractor 60 together with a rear implement 62 in the form of a seeder 263.

The seeder 263 comprises the following main components whereby reference is also made to the hydraulic supply system as described above in relation to FIG. 5:

A main frame 263a is supported on ground wheels 263b supporting the weight during operation. The main frame is attached to the rear lower links of the tractor indicated with LLC.

A seed reservoir 263c for stocking the seeds to be seeded in the process.

A seed meter 263d to receive seed from seed reservoir 263c and singulate the seeds for further processing in a substantially uniform and adjustable manner. The singulation may be done mechanically (e.g. by brushes) or by vacuum.

Multiple seeder row units 263e each for opening a seeding trench, placing the seed into the trench and closing the trench again. The seeder row units 263e can be lifted and lowered by a hydraulic cylinder indicated with RIC1 in FIG. 9.

A pneumatic seed delivery system 263f for taking the singulated seed from the seed meter 263d and transporting them to the seeder row units 263f via an air stream which is generated by one or more air blower 263g. The air blower 263g is driven by a hydraulic motor indicated as RIC2 in FIG. 9. The speed of the air blower 263g is monitored by an integrated speed sensor 263h to ensure constant seed delivery which is especially import when crop must be seeded with a uniform seeding distance between each seed to ensure uniform distance between each plant, e.g. when growing maize.

The front packer 262 consists of a frame 262a connected to the front linkage of the tractor. A packer roller or disc harrows 262b are rotatably mounted to the frame 262a so that they can be pushed over the field to cut cloddy soil and slightly pre-compact the soil to improve the seedbed. The front packer 262 also serves as ballast to counteract the vertical load applied on the rear linkage by the weight of the seeder 263 and distribute the force evenly on the ground to avoid excessive soil compaction.

Figure 9:
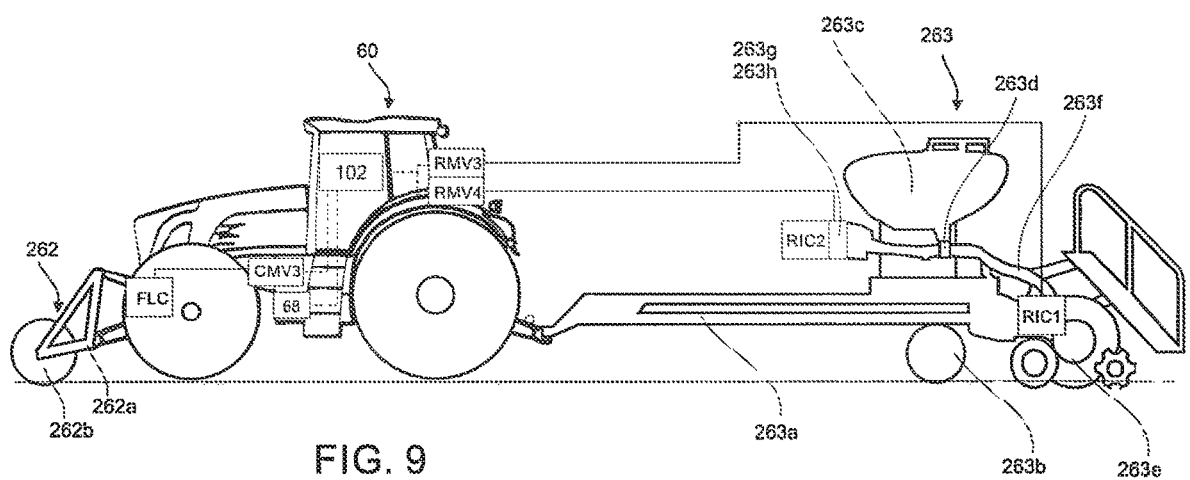
FIG. 9 is a schematic side view of an agricultural machine and an implement in form of a seeder.

Regarding the hydraulic drive system used on the front packer 262 and a seeder 263, the seeder consumers RIC1 and RIC2 are supplied by hydraulic valves of the rear manifold RVM (indicated at RMV3, RMV4 in FIGS. 5 and 9). The front packer 262 is raised and lowered by lower links FLC of the front linkage hydraulically actuated through central manifold valve CMV3.

Figure 10:
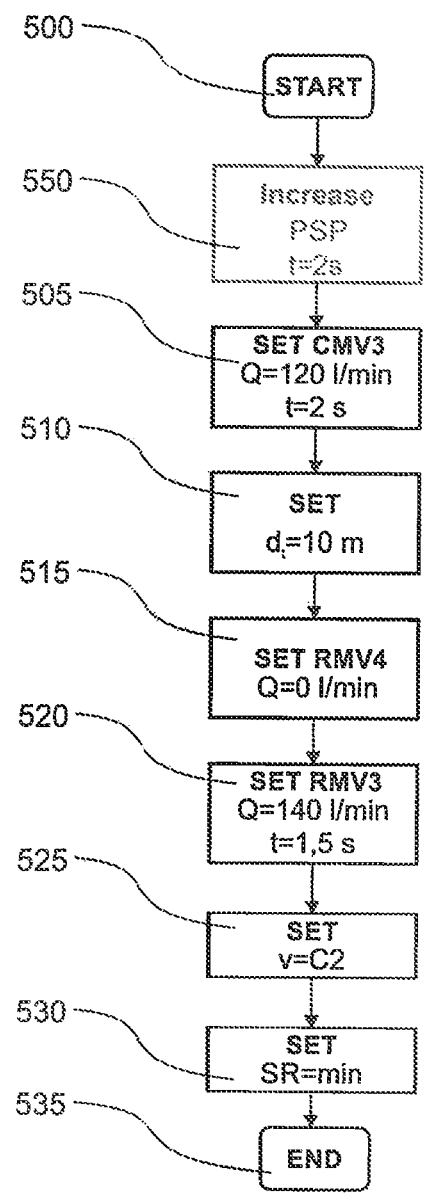
FIG. 10 is a flow chart depicting a storable headland sequence for use with an implement as shown in FIG. 9.

FIG. 10 illustrates a suitable headland sequence including steps 500, and 505 to 535, which are known in the art, plus an additional step 550. The known sequence will be described initially.

The known headland sequence has the following steps:

The sequence starts with step 500 when the headland sequence is activated. The sequence may be activated manually by a driver in accordance with tier 1 or automatically in accordance with any of tiers 2 to 4, such as when the tractor controller 102 determines that the tractor passes a headland area boundary based on GPS data and a field map.

At step 505 the central manifold valve CMV1 is set to a delivery rate of Q=120 l/min for 2 seconds to lift the front lower links FLC and raise the front packer 262.

At step 510, the one or more controllers 102 monitors travel distance and provides a signal if the tractor 60 has passed a distance of 10 m from the headland area, which is the approximate distance between the front packer and the seeder row unit 263a. This signal is used to add a delay before step 515.

At step 515 rear manifold valve RMV4 is set to a delivery rate of Q=0 l/min to stop the drive of air blower 263g and thereby seed delivery. The delay instigated at step 510 ensures that the seeding process is stopped when the seeder row unit 263a reaches the boundary of the headland area.

At step 520 rear manifold valve RMV3 is set to a delivery rate of Q=140 l/min for 1.5 seconds to lift the seeder row units 263e from their working position.

At step 525, the vehicle speed is set to a second value C2 stored in the controller 102. Depending on the operating conditions, C2 may be lower or higher than a first stored value C1 used during seeding.

At step 530, the steering ratio is set to reduced value which means that a small turn on the steering wheel results in a large steering angle at the steered wheels. This enables quick turns. During seeding, a higher steering ratio is mostly preferred to avoid unintended steering when the tractor and attached implements are intended to traverse the field in a straight line.

The headland sequence ends at step 535.

Further steps may be integrated in a headland sequence for planter set-up but are not discussed here as they are not considered relevant to the hydraulic supply system.

The above-described headland sequence places the front packer 262 and the rear seeder 263 in a suitable configuration to perform a headland turn. When the headland turn is complete a similar sequence but in reverse can be used to place the implements in a suitable configuration start a further seeding run across the field. Different parameters may be selected (by driver or automatically) for field work.

In the known headland sequence, an issue arises when the front packer 262 is lifted off the ground at step 505 giving rise to an increased hydraulic demand. This results in an increase of the load sensing pressure signal LSP which will lead to an adjustment of the pump supply output. As described before, one drawback of E-LS is that the overall reaction time to adjust the pump supply pressure PSP in response to an increase in consumer load sensing pressure LSP is higher than in a hydraulic LS system. Such a delay in the pump adjustment may result in a situation in which there is insufficient hydraulic supply to the consumers causing variations in the supply to air blower 263g driven by a hydraulic motor RIC2 followed by variations in the blower speed. This would impair constant seed delivery and seeding distance in the working area as the seeder approaches the headland area.

To mitigate this problem, the headland sequence is modified to include an additional step 550 after the headland sequence is activated but prior to step 505 in which the tractor controller 102 adjusts the pump control to raise the pump delivery and pump pressure PSP over a predetermined time period t (in this case 2 seconds but it could be longer or shorter). This means that the pump supply can be raised smoothly and the controller 102 is able to re-adjust hydraulic valve RMV4 driving air blower 263g to keep the speed of the air blower 263g constant. This ensures that the seeding distance is kept uniform in the working area until the seeder row units 263e reaches the headland boundary.

Alternatively, any of the LS dynamic parameters, which are dynamic pressure differential $\Delta P_{dyn}$ or the threshold value Tr of the rate of change of consumer load sensing pressure LSP, may be adapted to provide a faster response to the consumer demand LSP coming via LS which may also reduce variations in the blower speed.

In relation to the two exemplary embodiments, it is envisaged that the parameters set in step 450, 550 may be entered by the driver or the parameters can be set by a self-learning system, as already described above. In case of the embodiment shown in FIGS. 9 and 10, the controller may monitor the speed of the air blower 263g via the integrated speed sensor 263h and adapt the parameters adopted at step 550 during execution of the headland sequence with the target to minimize variations of the speed of the air blower 263g. This may be an iterative process.

Compared to the embodiment described in relation to FIGS. 6 to 8, which focuses on the reduction of operation time for the headland sequence, the embodiment described with reference to FIGS. 9 and 10 improves the quality of the working process.

Event Based Pump Supply Control

There are circumstances other than a headland operation in which an increase in hydraulic demand can be predicted and the pump supply output controlled predictively. In some embodiments, the previously described methods of controlling the pump supply output may be integrated into an event-based pump output adjustment sequence.

In some embodiments, the pump supply output is adjusted when a determination is made that one or more consumers is/are to be actuated or that a predefined operational sequence which involves actuation of at least one of the consumers and is known to give rise to an increased hydraulic demand is about to commence or has commenced.

Operative parameters on the tractor and/or an attached implement are monitored to recognize operational sequences which are known to give rise to, or to precede, an increased hydraulic demand from a consumer or consumers and the pump supply output, especially the pump supply pressure, is adjusted to meet the expected increase in demand when commencement of a particular operational sequence is detected. This takes advantage of the fact that if an electronic load sensing system is present, the system can be configured to adjust the pump supply output predictively not just in response to a load sensing pressure LSP.

In this context, it should be understood that terms such as "predictively" and "predictive mode" used in relation to adjustment of the pump supply refer to the fact that the pump supply pressure is adjusted, usually increased, before a hydraulic load demand has actually arisen or at least prior to one being sensed by the E-LS system.

Predictive pump supply adjustment can be applied to operational sequences or processes carried out by a tractor 60, or by an implement 62 attached to the tractor 60, or that are carried out jointly on a tractor and an attached implement.

Often an implement attached to a tractor will undertake a series of operations in a predicable sequence, an operational sequence, which gives rise to an increased hydraulic demand. If the occurrence of a first event (e.g. actuation of a particular hydraulic actuator or some other detectable event) is known to precede a given operational sequence, occurrence of the first event can be used to trigger adjustment of the pump supply output ready to meet the expected demand before a consumer associated with the operational sequence is actuated. This enables the system to operate in a highly dynamic way without overly compromising on efficiency. Such a first event may be defined as a trigger event.

In an example in which the implement comprises a baler/wrapper combination, when a bale is ready to be transferred to the wrapper, subsequent opening of the bale chamber door and wrapping of the bale will often result in higher demand from the corresponding hydraulic drives. The controller 102 is configured to adjust the pump supply to ensure the system can meet the predicted higher demand when the system detects that a bale is ready, or nearly ready, to be transferred. This helps the hydraulic supply system to achieve an appropriately dynamic response as the bale chamber door is opened and/or the wrapping processes commences. This embodiment will be described in further detail with reference to FIGS. 11 to 13.

Figure 11:
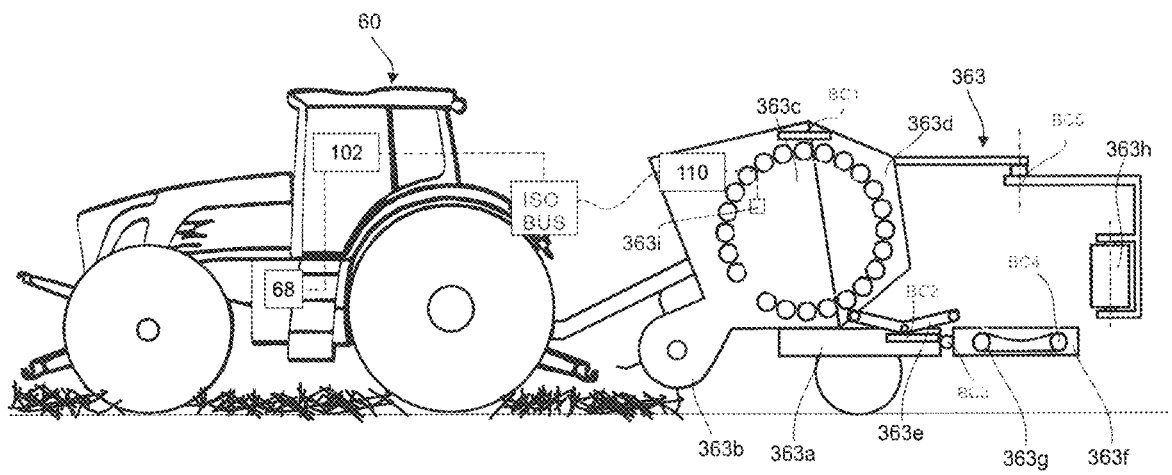
FIG. 11 is a schematic side view of an agricultural machine and implement combination.

FIG. 11 illustrates schematically a rear implement in the form of round baler and wrapper combination 363.

The baler/wrapper combination 363 consists of the following main components whereby reference is taken also to the hydraulic supply system as shown in FIG. 5 and described above:

A chassis 363*a* including ground wheels supporting the crop processing equipment.

A pick-up 363*b* to collect a crop swath, e.g. straw or grass, from the field. The pick-up 363*b* is driven via a PTO from the tractor (not shown).

A bale chamber 363*c* in which a round bale is formed and which includes a net binding device (not shown) to bind a net around the bale circumference after forming the bale to keep the bale together. The bale chamber 363*c* has rollers driven by via the PTO (not shown).

A bale chamber door (rear door) 363*d* which is driven by a linear hydraulic motor indicated as baler consumer BC1.

A bale transfer device 363*e* which is a swaying support with a linear hydraulic drive (indicated as baler consumer BC2) which moves the bale in a rearward direction.

A wrapper table 363*f* to support the bale during a wrapping process. The wrapper table is rotatably mounted to the chassis 363*a* and can be pivoted by a hydraulic drive indicated as baler consumer BC3 to lay the bale down smoothly on the field.

A bale rotator 363*g* assembled on the wrapper table 363*f* to slowly rotate the bale about an axis which is horizontal and transverse relative to the driving direction. Bale rotator 363*g* is driven by rotary hydraulic drive indicated as baler consumer BC4.

A wrapping arm 363*h* which rotates around the bale in a vertical axis to wrap a foil fed from a foil roll (not shown) around the bale. Wrapping arm 363*h* is driven by rotary hydraulic drive indicated as baler consumer BC5.

The baler/wrapper combination 363 is provided with further components to provide the full functionality but the focus is directed on those components which are relevant for the hydraulic supply system. Further details of a baler/wrapper can be seen in European Patent Publication 1266563 A1, Roundbaler for Agricultural Stock Material, published Dec. 18, 2002.

Regarding the hydraulic drive system on the baler, the baler consumers BC1, BC2, BC3, BC4 and BC5 are hydraulic drives which may be supplied by hydraulic valves of the rear manifold RVM (indicated as RMV3, . . . RMV5 in FIG. 5) so that e.g. hydraulic drive BC1 corresponds with RIC1. Alternatively, the hydraulic drives BC1, BC2, BC3, BC4 and BC5 may be supplied by a valve manifold on the implement (indicated as TVM in FIG. 5) which is connected to the main pump MP of the hydraulic supply system 64 via power beyond and the power beyond interface 70. In this case, hydraulic drive BC1 may correspond with RIC4.

In view of the number of consumers on the baler/wrapper 363, the rear valve manifold RMV or the implement valve manifold TMV will require additional valves to those shown in FIG. 5 to correspond to the number of consumers on the baler/wrapper combination 363.

Regarding the electronic network, the implement controller 110 may serve to control the implement valve manifold IVM but also process sensor information, e.g. from a bale size detection means 363*i* which determines the size of the bale for comparison with a target bale size value. The bale size detection means 363*i* is mainly used in the art to determine when a bale is completed and is ready to be discharged from the bale chamber 363*c*. Further sensing means may be provided to detect positions of a bale within the process, determine positions/status of the hydraulic consumers BC1 to BC5 and/or the status of the process steps involved. These are not described in detail. The implement controller 110 may be in communication with the tractor controller 102 via a standardized ISOBUS.

Figure 12:
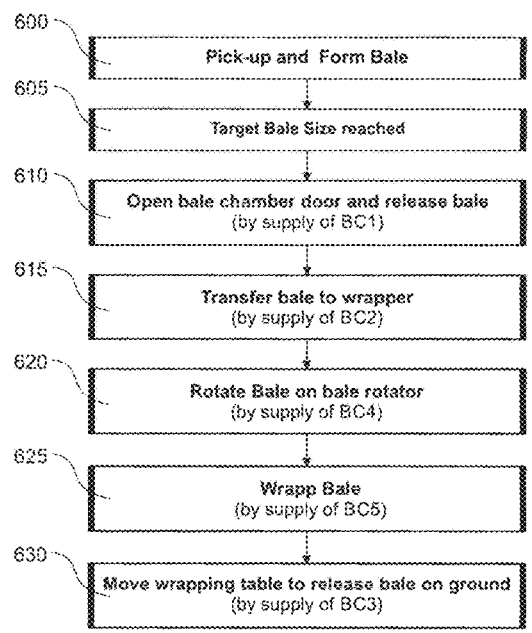
FIG. 12 is a flow chart depicting an operational sequence according to the prior art.

An operational sequence for the combined baler/wrapper according to the prior art is depicted in a flow chart in FIG. 12 with the following steps:

At step 600 crop is picked up and formed into a bale in the bale chamber.

At step 605 the bale size detection means 363*i* determines that the bale size has reached the target value.

At step 610 the bale chamber door 363*d* is opened by baler consumer BC1 to release the bale form the bale chamber 363*c* and drop the bale on the bale transfer device 363*e*.

At step 615 the bale is then transferred to the wrapping table by baler consumer BC2 operating bale transfer device 363*e*.

At step 620 the bale rotator 363*g* is rotated the bale about a horizontal transverse axle (in driving direction) driven by baler consumer BC4.

At step 625 the wrapping arm 363*h* rotates around the bale in a vertical axis driven by baler consumer BC5 to wrap a foil coming from a foil roll (not shown) around the bale. A sensing means not shown may determine competition of the wrapping process.

At step 630, after wrapping process is finished, the wrapper table 363f is pivoted by baler consumer BC3 to lay down the bale smoothly on the field.

Figure 13:
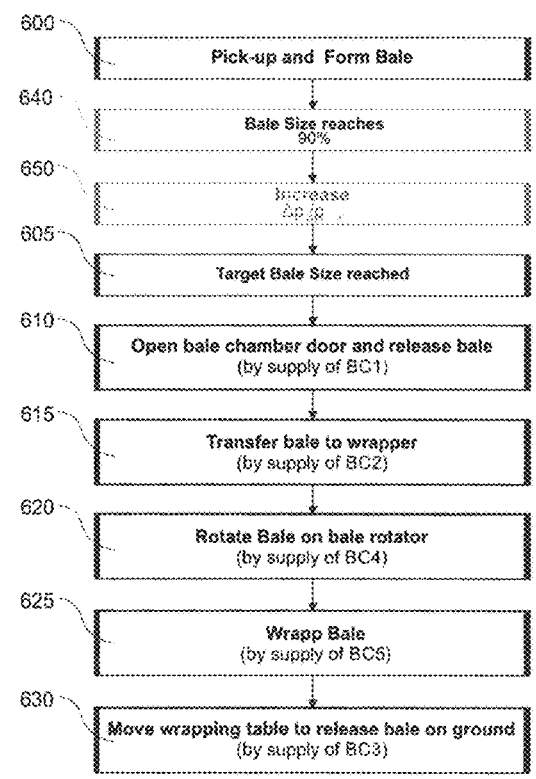
FIG. 13 is a flow chart depicting an operational sequence.

The steps described above may also involve further sensors to determine when a step starts or ends, e.g. sensing means may determine when the bale is at transfer position, but this is not described in detail or included in the operational sequences as depicted in FIGS. 12 and 13.

In the operational sequence according to the prior art, the hydraulic demand is quite constant during pick-up and formation of the bale as the pick-up 363b and the bale chamber 363c are driven via the PTO rather than the hydraulic supply system 64. However, when the bale is released from the bale chamber and processed further, the hydraulic baler consumers BC1 to BC5 require increased hydraulic supply. This results in an increase of the load sensing pressure signal LSP which triggers a pump adjustment to increase the pump supply pressure PSP. With the known E-LS systems, there is a delay between the load sensing pressure LSP increasing and the subsequent increase in the hydraulic supply which affects the operation time for the overall process. As a consequence, it is often necessary to stop the tractor 60 before a further is processed.

To mitigate this problem, the operational sequence is adapted according to an embodiment as depicted in FIG. 13. While the steps 600, 605, 610, 615, 620, 625, 630 remain the same as already described in FIG. 7, additional steps 640 and 650 are added prior to step 605.

During step 600 the implement controller 110 monitors bale size by using the information retrieved with bale size detection means 363i. At step 640 the controller determines that a triggering event has occurred when the bale size reaches a certain value, such as 90% of the target value. This provides an indication that the hydraulic demand will shortly increase to carry out steps 610, 615, 620, 625 and 630. At step 650 and in response to the triggering event, the implement controller 110 sends a signal to the tractor controller 102 to adjust the pump supply control to a higher output by means of pump output controller 68. This may happen in two different ways:

1. The pump pressure PSP is set to a predetermined value. This may be seen as a predictive adjustment in which the pump supply pressure is initially raised without reference to the load sensing pressure. The control system may revert to a load sensing mode of control in which the pump supply is regulated in dependence on a load sensing pressure signal LSP after a predetermined time period or based on any other parameter indicating that the hydraulic supply is sufficient to meet the hydraulic demands of the event or sequence.
2. Alternatively, if the control system is configured to regulate the pump supply based on the rate of increase of a load sensing pressure LSP as described above, the tractor controller may be configured in response to a trigger event to adopt values of the LS dynamic parameters (the dynamic pressure differential $\Delta P_{dyn}$ and/or the threshold value Tr of the rate of increase of consumer load sensing pressure LSP) which provide a faster more dynamic response to the consumer demand coming via the load sensing system LS.

If the predictive adjustment of option 1 is adopted, the hydraulic supply will already have been increased to meet the predicted hydraulic demand of consumer BC1 at step 410 and for consumers BC2 to BC5 in the subsequent steps.

If option 2 is adopted, the pump supply control will react more quickly to an increase in the load sensing pressure LSP generated at step 610 by actuation of consumer BC1. Either option will result in a reduced operation time for the overall process and more efficiency in the baling/wrapping process.

As the steps described above may also involve further sensors to determine if a step starts or ends, e.g. sensing means may determine when the bale is at transfer position, the increase of the pump supply as depicted in step 650 may be triggered by other events determined via sensors which are not shown.

A further example relates to the pick-up of a round baler. When the pickup is lifted, this indicates an inoperative condition. If the driver lowers the pickup into the swath, this may not require higher hydraulic demand (or raise the load sensing pressure signal LSP) as the pickup may be lowered by gravity. However, in this embodiment, the control system may recognize that the next step will be to activate the bale processing equipment (baler belt drive) which will result in a higher demand and pre-emptively adjusts the pump supply pressure PSP or adopts more dynamic LS to a suitable value for the process or modifies the LS dynamic parameters to provide for a more dynamic response to the LSP increasing when the bale processing equipment is actuated.

As described above in relation to the combined round baler/wrapper 363, in embodiments in which the implement 62 has a controller 110, the implement controller 110 can be configured to determine when a particular operational sequence has been, or is about to be, initiated on the implement and to forward a signal to the tractor controller 102 to raise the pump supply pressure or modify the LS dynamic parameters. Data enabling the tractor controller to select a suitable value to which the pump supply pressure PSP should be raised or appropriate LS dynamic parameters may be forwarded from the implement controller 110 to the tractor controller 102. Alternatively, the implement controller 110 may forward a signal to the tractor controller indicative that a particular trigger event has occurred and the tractor controller 102 be programmed in response to retrieve a suitable set point value for the pump supply pressure PSP and/or LS dynamic parameters associated with that event saved in memory accessible by the tractor controller, such as in a look-up table or characteristic map. In a further alternative, the tractor controller may be programmed to raise the pump supply pressure to a set value (e.g. the max system pressure) when it receives a signal from the implement controller 110 indicative that a trigger event has occurred.

An example relating to consumers on the tractor 60 arises when a hydraulic damping function for the tractor linkage is activated when the tractor is to be driven on a road. This may require the pump supply pressure to be raised or more dynamic LS dynamic parameters adopted to enable dynamic damping on the road. In this case, activation of the damping function is a trigger event which the tractor controller 102 is programmed to respond to by predictively increasing the pump supply pressure PSP and/or selecting suitable LS dynamic parameters.

For reasons of economy, it is not desirable to maintain a high pump supply pressure PSP unnecessarily. Accordingly, the control system will typically be arranged to revert to a load-sensing-based control of the pump supply output following a predictive adjustment.

In an embodiment, the tractor controller is programmed to revert to a load-sensing-based control of the pump supply output after a set time limit following a trigger event being detected or following a predictive adjustment of the pump supply. This may be a default time limit applied in all cases or different time limits can be applied for different operational sequences which trigger a predictive adjustment. It may be appropriate for an increased pump supply pressure to be maintained for longer in respect of some operational sequences than others and the control system can be programmed to take this into account.

In an alternative embodiment, the tractor controller is programmed to revert to a load-sensing-based control of the pump supply output when a certain operational parameter is met. This might be confirmation, such as from a sensor, that a particular operational sequence has been completed. Alternatively, the controller may monitor the pump supply pressure PSP, such as using data provided by the pressure sensor 132, and be programmed to revert to a load sensing mode of control of the pump supply if the pump supply pressure PSP is higher than the expected peak demand of the operational sequence and higher than the highest load sensing pressure LSP being reported at the time. This indicates that the pump supply is able to meet the hydraulic demand of the operational sequence and that it is appropriate to recommence control of the pump supply based on load sensing.

This program can be adopted in hydraulic supply systems in which the electronic load sensing system E-LS is not configured to adjust the pump supply pressure PSP in dependence on the rate of increase of the load sensing pressure or not. In this case, the system is configured to make a predictive adjustment of the pump supply pressure as set out in option 1 above in response to a trigger event. However, if the E-LS system is configured to adjust the pump supply pressure PSP in dependence on the rate of change of the load sensing pressure, the controller 102 may be configured to adopt either of options 1 or 2 as set out above. Regardless of which option is applied, the controller 102 may be configured to apply particular values for the LS dynamic parameters for a given operational sequence in the event that load sensing control of the pump supply is reinstated part way through the operational sequence. It may be appropriate to use more dynamic settings of the LS dynamic parameters for a particular operational sequence than would usually be applied for the respective consumer or consumers when actuated outside of the operational sequence.

A trigger event or commencement of a particular operational sequence requiring a predictive pump supply adjustment can be detected in a wide range of ways. One or more sensors may be used to detect operational parameters indicative of a trigger event. For example, in the case of the baler/wrapper example discussed above, a sensor may be provided to detect when a bale is ready to be transferred. Alternatively, a camera-based system may be used to monitor events which precede an operational sequence. In other circumstances, actuation of one or more consumers and/or other actuators, such as in a particular sequence, can be used as a trigger event. Accordingly, the tractor controller may monitor data from various user interfaces and/or valve controllers and be programmed to recognize a given actuation or sequence of actuations as a trigger event.

Event based predictive pump supply adjustment can be combined with self-learning techniques similar to those discussed above in relation to automatic adaptation of LS dynamic parameters.

In an embodiment, the controller 102, is configured to automatically adapt predictive control of the pump supply for a given operational sequence by monitoring one or more operational parameters during execution of the operational sequence to determine if the operational parameter meets an operational target associated with at least one consumer actuated as part of the sequence. This may be an iterative process.

For example, the controller 102 may initially calculate a predicted consumer load for the consumer or consumers which are the be actuated as part of the operational sequence and set the pump supply pressure PSP to a first set point to meet this predicted consumer demand when a predictive adjustment of the pump supply is initiated by a trigger event. During execution of the sequence, the controller monitors the pump supply pressure PSP against the actual load sensing pressure demand. If the controller determines that the pump supply pressure PSP either exceeds or fails to meet the highest actual consumer load sensing pressure LSP reported during the sequence by an amount outside of preset tolerances, the controller may set the highest actual reported load sensing pressure as the predicted load sensing pressure and apply this setting to determine a revised set point for the pump supply pressure when a predictive adjustment of the pump supply is subsequently trigged for the same operational sequence.

Alternatively, the operational target may be a set time limit for response of a particular consumer. Thus, the target may be a set time limit for the consumer to respond to its actuation. Data from one or more sensors arranged to determine response of the consumer is provided to the controller and the controller 102 configured to automatically adjust the set point for the pump supply pressure so as to meet the set time limit using the lowest possible pump supply pressure PSP. If a consumer is an actuator which moves a component, a sensor or sensors may be arranged to detect movement of the component as indicative of the response of the consumer.

The adapted settings may be stored, such as in a lookup table or characteristic map, in a memory accessible to the controller 102 from which they can be subsequently recalled and/or applied in respect of a particular operational sequence. The controller 102 may be configured to update a model used to predictively control the pump supply pressure for an operational sequence when a trigger event is detected with settings derived during runtime.

Figure 1:
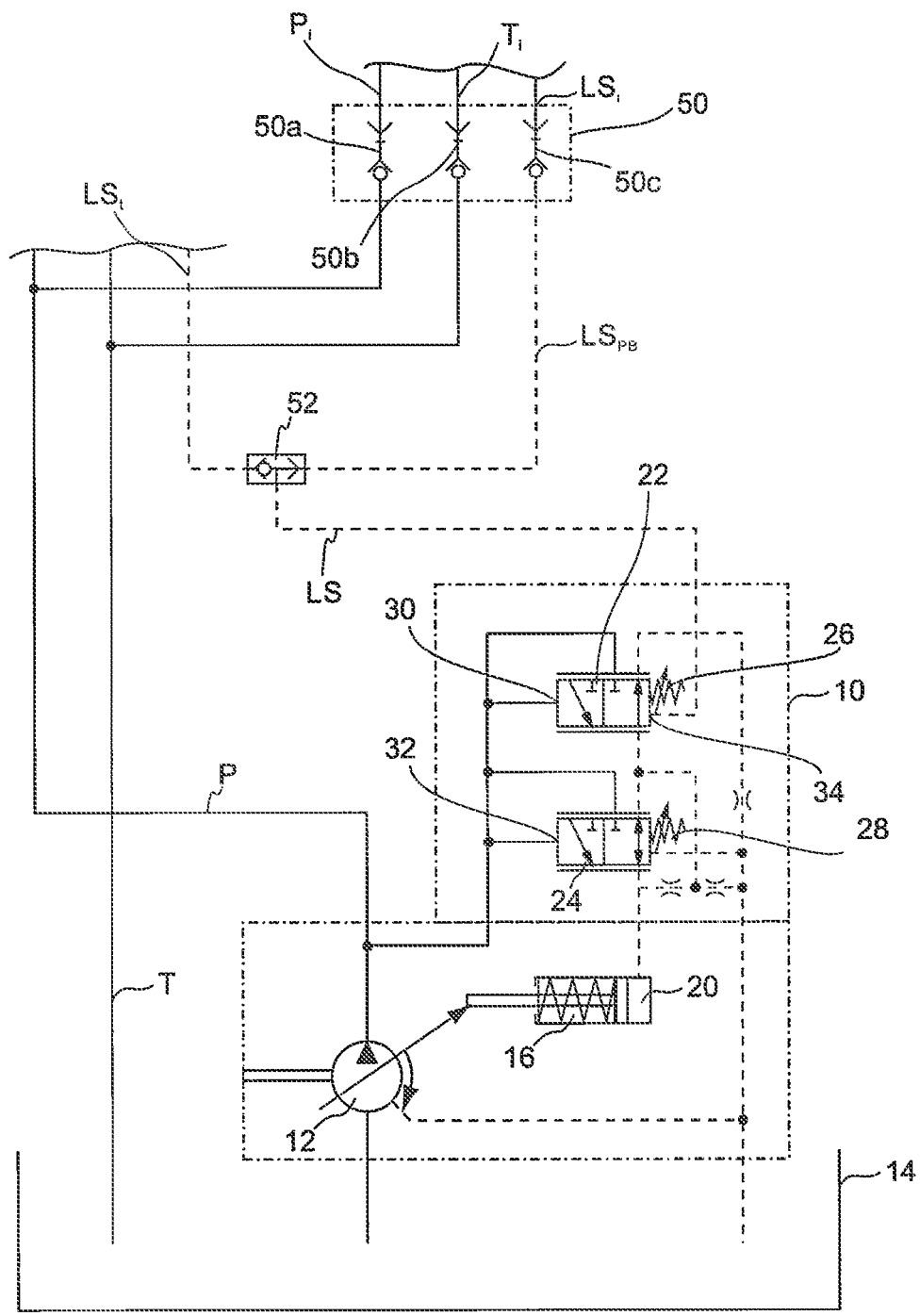
FIG. 1 illustrates part of a simplified known CC-LS hydraulic circuit.
Figure 2:
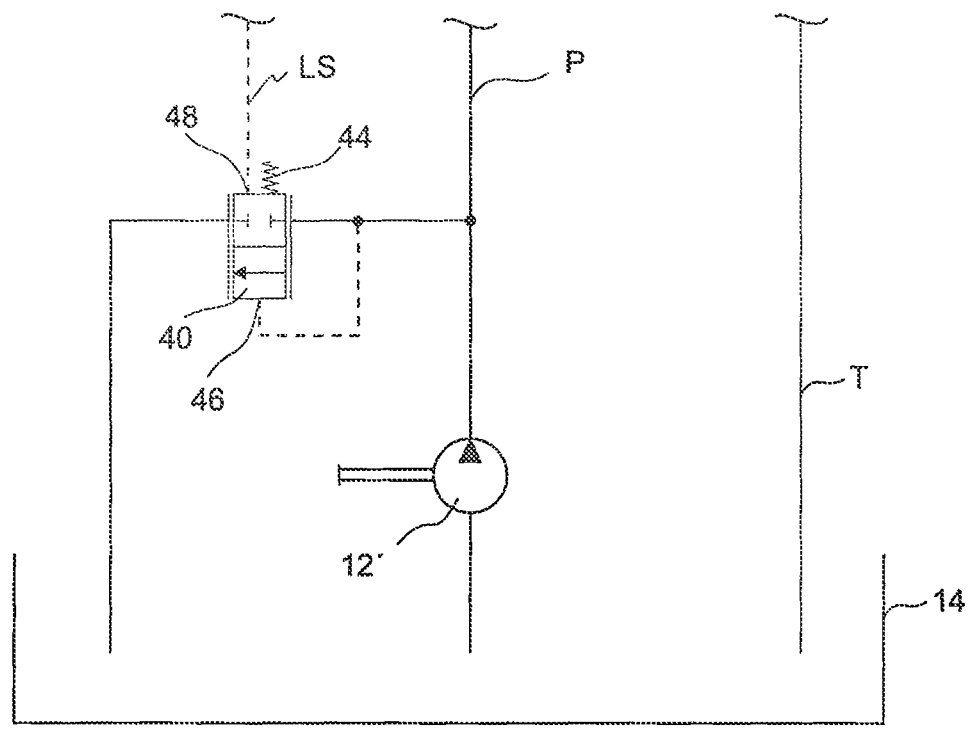
FIG. 2 illustrates part of a simplified OC-LS hydraulic circuit.

Various modifications to the systems and methods will be apparent to those skilled in the art, without departing from the scope of the disclosure. For example, the main pump MP may be a fixed displacement pump and the pump supply may be configured generally as illustrated in FIG. 2. In this case, the pump supply pressure PSP may be regulated by directing a hydraulic LS pump supply control signal $P_{set}$ from a solenoid-controlled pressure limiting valve similar to the pressure limiting valve indicated with 54 in FIG. 3 to the load sensing port 48 of the proportional pressure compensator valve 40. The solenoid-controlled pressure limiting valve 54 being controlled by the electronic pump supply control signal EPCS from the tractor controller 102. If the hydraulic system has more than one pump for supplying different consumers, the systems and methods for controlling the output of a pump in dependence on the value and rate of increase of the load sensing pressure LSP as described above can be adopted for each pump. In this case, the LS dynamic parameters can be selected/modified as appropriate for each pump.

The invention claimed is:

1. A control system for controlling a hydraulic supply system on a mobile machine, wherein the hydraulic supply system includes a pump supply for supplying pressurized fluid to at least one consumer carried by the mobile machine;

the control system comprising at least one controller, and being configured to:

receive, from a pressure sensor of a load sensing LS system associated with the at least one consumer, a pressure signal indicative of a sensed load sensing pressure (LSP) associated with the at least one consumer;

determine, from the received pressure signal, a rate of increase of the sensed LSP; and adjust a pump supply pressure (PSP) provided by the pump supply in dependence on the determined rate of increase of the sensed LSP;

wherein the control system is configured to adjust the PSP to be higher than the sensed LSP by a first pressure differential when a determined rate of increase of the sensed LSP is below a threshold value T and to adjust the PSP to be higher than the sensed LSP by a second pressure differential larger than the first pressure differential for at least a limited time when a determined rate of increase of the sensed LSP is at least as high as the threshold value T.

2. The control system as of claim 1, wherein the control system is configured to adjust the PSP to be higher than the sensed load sensing LSP by the second pressure differential when a determined rate of increase of the sensed LSP is at least as high as the threshold value T and below a second threshold value T2 higher than the threshold value T, and to adjust the PSP to be higher than the sensed LSP by a third pressure differential larger than the second pressure differential when a determined rate of increase of the sensed LSP is at least as high as the second threshold value T2.

3. The control system as of claim 1, wherein the first pressure differential comprises a stand-by pressure differential $\Delta P_{st}$.

4. The control system as of claim 3, wherein the second pressure differential comprises the stand-by pressure differential $\Delta P_{st}$ plus a dynamic pressure differential $\Delta P_{dyn}$.

5. The control system of claim 4, wherein the control system is configured to adjust the PSP to be higher than the sensed LSP by the second pressure differential when a determined rate of increase of the sensed LSP is at or above the threshold value T and below a second threshold value T2 higher than the threshold value T, and adjusting the PSP to be higher than the sensed LSP by a third pressure differential larger than the second pressure differential when a determined rate of increase of the sensed LSP is at or above the second threshold value T2, and wherein the third pressure differential comprises the stand-by pressure differential $\Delta P_{st}$ plus a second dynamic pressure differential $\Delta P2_{dyn}$ larger than the first dynamic pressure differential $\Delta P_{dyn}$.

6. The control system claim 4, wherein the at least one controller is configured to apply at least one value selected from the group consisting of the threshold value T of the rate of increase of sensed and the dynamic pressure differential $\Delta P_{dyn}$ in dependence on at least one selected from the group consisting of:

the consumer generating the sensed LSP on which adjustment of the pump supply output is dependent;

operational parameters of the hydraulic supply system;

the value of the sensed LSP on which adjustment of the pump supply output is dependent; and dynamic behavioral characteristics of a branch of the hydraulic supply system that supplies the consumer generating the sensed LSP on which adjustment of the pump supply is dependent.

7. The control system of claim 4, wherein the at least one controller is configured to:

automatically adjust at least one selected from the group consisting of the threshold value T of the rate of increase of sensed LSP and the dynamic pressure differential $\Delta P_{dyn}$; and determine an operational response of the at least one consumer with reference to an operational target associated with the at least one consumer.

8. The control system of claim 7 wherein the at least one controller is configured to:

store at least one value selected from the group consisting of the threshold T for the rate of increase of load sensing pressure LSP and the dynamic pressure differential $\Delta P_{dyn}$ in dependence on the determined operational response meeting the operational target; and apply the at least one stored value during subsequent operation of the at least one consumer.

9. The control system of claim 4, wherein the hydraulic supply system comprises at least one consumer carried by an implement attached to the mobile machine which is supplied with pressurized fluid from the pump supply on the mobile machine, wherein the at least one controller is configured to receive, from a pressure sensor of a load sensing LS system associated with the at least one consumer carried by the implement, a pressure signal indicative of a sensed LSP associated with the at least one consumer carried by the implement.

10. The control system of claim 9, wherein the at least one controller comprises at least a first controller on the mobile machine and a second controller on the implement; the first and second controllers being in communication with one another, the second controller being configured to forward data to the first controller indicative of at least one value for at least one selected from the group consisting of the threshold T of the rate of increase of sensed LSP and the dynamic pressure differential $\Delta P_{dyn}$ applicable when the PSP is adjusted in dependence on a sensed LSP associated with the at least one consumer carried by the implement.

11. The control system of claim 1, wherein the hydraulic supply system comprises more than one consumer and more than one pressure sensor, each pressure sensor for sensing a LSP associated with at least one of the consumers, wherein the at least one controller is configured to receive pressure signals indicative of sensed LSP from each of the pressure sensors and the control system configured to adjust the PSP in dependence on the pressure signal indicative of the highest sensed LSP.

12. A mobile machine comprising:

a hydraulic supply system including a pump supply for supplying a pressurized fluid to at least one consumer carried by the mobile machine;

a pressure sensor of a load sensing system associated with the at least one consumer; and a control system for controlling the hydraulic supply system of claim 1.

13. The mobile machine of claim 12, wherein the plurality of consumers comprises at least one selected from the group consisting of a consumer on the mobile agricultural machine and an implement attached to the mobile agricultural machine.

14. A method of controlling a hydraulic supply system on a mobile machine, wherein the hydraulic supply system includes a pump supply for supplying a pressurized fluid to at least one consumer carried by the mobile machine, the method comprising:

receiving, from a pressure sensor of a load sensing LS system associated with the at least one consumer, a pressure signal indicative of a sensed load sensing pressure (LSP) associated with the at least one consumer;

determining, from the received pressure signal, a rate of increase of the sensed LSP;

adjusting a pump supply pressure (PSP) provided by the pump supply in dependence on the determined rate of increase of the LSP;

adjusting the PSP to be higher than the sensed LSP by a first pressure differential when a determined rate of increase of the sensed LSP is below a threshold value T; and adjusting the PSP to be higher than the sensed LSP by a second pressure differential larger than the first pressure differential when a determined rate of increase of the sensed LSP is at least as high as the threshold value T.

15. The method of claim 14, further comprising:

adjusting the PSP to be higher than the sensed LSP by the second pressure differential when a determined rate of increase of the sensed load LSP is at least as high as the threshold value T and below a second threshold value T2 higher than the first mentioned threshold value T; and adjusting the PSP to be higher than the sensed LSP by a third pressure differential larger than the second pressure differential when a determined rate of increase of the sensed LSP is at or above the second threshold value T2.

16. The method of claim 14, wherein the first pressure differential comprises a stand-by pressure differential $\Delta P_{st}$.

17. The method of claim 16, wherein the second pressure differential comprises the stand-by pressure differential $\Delta P_{st}$ plus a dynamic pressure differential $\Delta P_{dyn}$.

18. The method of claim 17, further comprising:

adjusting the PSP to be higher than the sensed LSP by the second pressure differential when a determined rate of increase of the sensed LSP is at least as high as the threshold value T and below a second threshold value T2 higher than the threshold value T; and adjusting the PSP to be higher than the sensed LSP by a third pressure differential larger than the second pressure differential when a determined rate of increase of the sensed LSP is at least as high as the second threshold value T2, wherein the third pressure differential comprises the stand-by pressure differential $\Delta P_{st}$ plus a second dynamic pressure differential $\Delta P2_{dyn}$ larger than the first mentioned dynamic pressure differential $\Delta P_{dyn}$.

19. The method of claim 17, wherein the method comprises further comprising applying values for at least one selected from the group consisting of the threshold value T of the rate of increase of sensed LSP and the dynamic pressure differential $\Delta P_{dyn}$ in dependence at least one selected from the group consisting of:

the consumer generating the sensed LSP on which adjustment of the pump supply is dependent:

operational parameters of the hydraulic supply system;

the value of the sensed LSP on which adjustment of the pump supply output is dependent; and dynamic behavioral characteristics of a branch of the hydraulic supply system that supplies the consumer generating the sensed LSP on which adjustment of the pump supply is dependent.

20. The method of claim 17, further comprising:

automatically adjusting at least one selected from the group consisting of the threshold value T of the rate of increase of load sensing pressure LSP and the dynamic pressure differential $\Delta P_{dyn}$; and determining an operational response of the at least one consumer with reference to an operational target associated with the at least one consumer.

21. The method of claim 20, further comprising:

storing at least one value selected from the group consisting of the threshold T for the rate of increase of load sensing pressure LSP and the dynamic pressure differential $\Delta P_{dyn}$ in dependence on the determined operational response meeting the operational target; and applying the at least one stored value during subsequent operation of the at least one consumer.

22. The method of claim 17, wherein the hydraulic supply system comprises at least one consumer on an implement attached to the mobile machine supplied with pressurized fluid from the pump supply on the mobile machine, the method comprising receiving, from a pressure sensor of a load sensing LS system associated with the at least one consumer carried by the implement, a pressure signal indicative of a sensed LSP associated with the at least one consumer carried by the implement.

23. The method of claim 14, wherein the hydraulic supply system comprises more than one consumer and more than one pressure sensor for sensing the LSP of at least some of the consumers, each pressure sensor being in signal communication with the at least one controller, the method further comprising adjusting the PSP in dependence on the pressure signal indicative of the highest sensed LSP forwarded to the at least one controller at a time.

* * * * *